(12) United States Patent
Yokota et al.

(10) Patent No.: US 12,018,969 B2
(45) Date of Patent: Jun. 25, 2024

(54) VOLUME MEASUREMENT APPARATUS, SYSTEM, METHOD, AND PROGRAM

(71) Applicant: NEC Communication Systems, Ltd., Tokyo (JP)

(72) Inventors: Hiroki Yokota, Tokyo (JP); Masanori Takaoka, Tokyo (JP); Noriyuki Aoki, Tokyo (JP); Kenji Kono, Tokyo (JP)

(73) Assignee: NEC Communication Systems, LTD., Tokyo (JP)

( * ) Notice: Subject to any disclaimer, the term of this patent is extended or adjusted under 35 U.S.C. 154(b) by 447 days.

(21) Appl. No.: 17/417,317

(22) PCT Filed: Nov. 20, 2019

(86) PCT No.: PCT/JP2019/045391
§ 371 (c)(1),
(2) Date: Jun. 22, 2021

(87) PCT Pub. No.: WO2020/105669
PCT Pub. Date: May 28, 2020

(65) Prior Publication Data
US 2022/0252443 A1    Aug. 11, 2022

(30) Foreign Application Priority Data

Nov. 21, 2018   (JP) ................ 2018-218148

(51) Int. Cl.
*G01F 22/00*    (2006.01)
*G01B 11/22*    (2006.01)
*G06T 7/70*     (2017.01)

(52) U.S. Cl.
CPC .............. *G01F 22/00* (2013.01); *G01B 11/22* (2013.01); *G06T 7/70* (2017.01)

(58) Field of Classification Search
CPC ......... G01F 22/00; G01B 11/22; G01B 11/00; G01B 11/24; G06T 7/70; G06T 2207/10028; G06T 7/62
See application file for complete search history.

(56) References Cited

U.S. PATENT DOCUMENTS 9,656,429 B1 *   5/2017   Mantha ................ B33Y 50/02
11,062,061 B2    7/2021   Martinsson et al.
2014/0163885 A1 * 6/2014  Clar ........................ G06F 15/00
                                                            702/5

FOREIGN PATENT DOCUMENTS

CN          169384 A      11/2005
CN       105551064 A       5/2016
(Continued)

OTHER PUBLICATIONS

Search Report for SG Application No. 11202104860W dated Jun. 30, 2022.
(Continued)

*Primary Examiner* — Tarun Sinha
*Assistant Examiner* — Drexel Alejandro Venero

(57) ABSTRACT

A volume measurement apparatus comprises: a point group conversion part converting depth information from a depth sensor into point group data; a raw material heap detection part detecting a point group related to a raw material heap from the point group data, using repose angle information; and a raw material heap volume calculation part that calculates a volume of the raw material heap non-occlusion part based on the point group related to the raw material heap; estimates a volume of the raw material heap occlusion part in the raw material heap, using at least the point group related to the raw material heap; and calculates a volume of the raw material heap, which is a sum of the calculated (Continued)

volume of the raw material heap non-occlusion part and the estimated volume of the raw material heap occlusion part.

16 Claims, 18 Drawing Sheets

(56) References Cited

FOREIGN PATENT DOCUMENTS

| | | | |
|---|---|---|---|
| CN | 106094702 A | 11/2016 | |
| CN | 106610263 A | 5/2017 | |
| CN | 106839975 A | 6/2017 | |
| CN | 107437268 A | 12/2017 | |
| CN | 108182715 A | 6/2018 | |
| DE | 10005127 A1 * | 8/2001 | ........... B60Q 1/1423 |
| JP | H01-321206 A | 12/1989 | |
| JP | 2005-308502 A | 11/2005 | |
| JP | 2010-286436 A | 12/2010 | |
| JP | 2011-157187 A | 8/2011 | |
| JP | 2012-193030 A | 10/2012 | |
| JP | 2013-002909 A | 1/2013 | |
| JP | 2016-061674 A | 4/2016 | |
| JP | 2016-088694 A | 5/2016 | |
| JP | 2020009326 A * | 1/2020 | |
| WO | 2016/159839 A1 | 10/2016 | |
| WO | 2017/175312 A1 | 10/2017 | |
| WO | WO-2017175312 A1 * | 10/2017 | ............. B65G 1/137 |

OTHER PUBLICATIONS

Chinese Office Communication for CN Application No. 201980076211.4 dated Sep. 5, 2022 with English Translation.
International Search Report for PCT Application No. PCT/JP2019/045391, dated Dec. 24, 2019.
C. Bradford Barber et al., "The Quickhull Algorithm for Convex Hulls", ACM Transactions on Mathematical Software, vol. 22, Issue 4, Dec. 1996, pp. 469-483.

* cited by examiner

VOLUME MEASUREMENT APPARATUS, SYSTEM, METHOD, AND PROGRAM

This application is a National Stage Entry of PCT/JP2019/045391 filed on Nov. 20, 2019, which claims priority from Japanese Patent Application 2018-218148 filed on Nov. 21, 2018, the contents of all of which are incorporated herein by reference, in their entirety.

FIELD

Description of Related Application

The present invention is based on claiming priority of Japanese patent application: JP2018-218148 (filed on Nov. 21, 2018), and the entire contents of the present application shall be incorporated and stated in the present application by reference thereto.

The present invention relates to a volume measurement apparatus, a system, a method, and a program for measuring a volume of a raw material heap in a raw material yard.

Background

At glass factories and steel mills, silica sand being a raw material for glass, and iron ore being a raw material for steel, are stored indoors or outdoors in a raw material yard (raw material storage place) surrounded by walls on three sides. FIG. 17 is an image view of a raw material yard 10 surrounded by walls 12 on three sides when viewed from above. Each raw material heap 11 on which the raw material is deposited is surrounded on three sides by a wall 12. Depending on operation of a factory, a remaining amount of raw material changes from moment to moment. At present, workers often visually manage the remaining amount of this raw material.

In order to maintain high productivity, it is important to quickly and accurately grasp the remaining amount of raw materials. That is, there is a demand for a system for automatically managing the remaining amount in real time. When constructing a remaining amount management system for raw materials, it is conceivable to use a depth sensor (depth measurement sensor) as a sensor for measuring a remaining amount. As a technique for managing a shape of a raw material heap using a depth sensor, there are techniques described in Patent Literatures (PTLs) 1 to 3. In the techniques described in PTLs 1 to 3, a shape of a raw material heap is measured by attaching a depth sensor such as a laser scanner, a 2D (2-Dimensions) laser distance meter, and a stereo camera to a yard machine such as a stacker or a reclaimer. In a system using such a depth sensor, in order to acquire three-dimensional data by shooting a measurement object from a plurality of viewpoints, generally, a plurality of depth sensors are used.

[PTL 1] JP2010-286436A1
[PTL 2] JP2011-157187A1
[PTL 3] JP2012-193030A1
[PTL 4] JP2016-61674A1
[NPTL 1] C. BRADFORD BARBER et al., "The Quickhull Algorithm for Convex Hulls", ACM Transactions on Mathematical Software, Vol. 22, No. 4, December 1996, Pages 469-483. (https://www.cise.ufl.edu./~ungor/courses/fall06/papers/QuickHull.pdf)

SUMMARY

The following analysis is given by the inventors of the present application.

In the techniques described in PTLs 1 to 3, since a depth sensor is mounted to a yard machine, it enables to perform work such as receiving, delivering etc. of raw materials while measuring a shape of a raw material heap. Therefore, measuring by mounting a depth sensor to a yard machine may affect operation of a factory.

Also, although a price of depth sensors has been decreasing in recent years, those that satisfy sufficient measurement range, accuracy and fineness in industrial applications are still expensive. Even when viewed from a viewpoint of maintainability, it is not desirable to use multiple depth sensors. If a system be constructed with a single depth sensor, there will be brought about a problem in which an invisible region (occlusion) occurs by an object locating on a front side hiding an object locating on a rear side in a three-dimensional space. For example, when a raw material heap is shot from a front surface direction, a back surface direction portion of the raw material heap is hidden, and depth information of the back surface direction portion cannot be acquired.

In order to solve such an occlusion problem, it is conceivable to shoot a raw material heap while moving from above with one unmanned flying object (drone) mounting a depth sensor like a technique described in PTL 4. However, since a building-type raw material yard has a ceiling, it is difficult for a drone to navigate at a sufficient distance from a raw material heap, and a wind from the drone's propeller winds up the raw material, a measurement itself may not be possible.

Also, in order to solve the occlusion problem, it is conceivable that a worker would go around a raw material heap and shoot with one depth sensor. However, if raw material yards are a large scale or multiple, not only it takes time and works to measure, but it is also necessary to avoid a yard machine during operation, so efficient measurement may not be performed.

It is a main subject of the present invention to provide a volume measurement apparatus, system, method, and program that can contribute to measuring a volume of a raw material heap at low cost and efficiently without affecting operation of a factory.

A volume measurement apparatus according to a first aspect comprises: a point group conversion part that converts depth information related to a raw material yard from a depth sensor that shoots the raw material yard having a raw material heap into point group data related to the raw material yard; a raw material heap detection part that detects a point group related to the raw material heap from the point group data related to the raw material yard, using repose angle information related to a repose angle of the raw material heap; and a raw material heap volume calculation part that calculates a volume of the raw material heap non-occlusion part that can be shot from the depth sensor in the raw material heap based on the point group related to the raw material heap; estimates a volume of the raw material heap occlusion part that cannot be shot from the depth sensor in the raw material heap, using at least the point group related to the raw material heap; and calculates a volume of the raw material heap, which is a sum of the calculated volume of the raw material heap non-occlusion part and the estimated volume of the raw material heap occlusion part.

A volume measurement system according to a second aspect comprises: a depth sensor that shoots a raw material yard having a raw material heap; and a volume measurement apparatus according to the first aspect.

A volume measurement method according to a third aspect comprises: converting depth information related to a raw material yard from a depth sensor that shoots the raw material yard having a raw material heap into point group data related to the raw material yard; detecting a point group related to the raw material heap from the point group data related to the raw material yard, using repose angle information related to a repose angle of the raw material heap; and calculating a volume of the raw material heap non-occlusion part that can be shot from the depth sensor in the raw material heap based on the point group related to the raw material heap; estimating a volume of the raw material heap occlusion part that cannot be shot from the depth sensor in the raw material heap, using at least the point group related to the raw material heap; and calculating a volume of the raw material heap, which is a sum of the calculated volume of the raw material heap non-occlusion part and the estimated volume of the raw material heap occlusion part.

A program according to a fourth aspect causes hardware resources to execute processings comprising: converting depth information related to a raw material yard from a depth sensor that shoots the raw material yard having a raw material heap into point group data related to the raw material yard; detecting a point group related to the raw material heap from the point group data related to the raw material yard, using repose angle information related to a repose angle of the raw material heap; and calculating a volume of the raw material heap non-occlusion part that can be shot from the depth sensor in the raw material heap based on the point group related to the raw material heap; estimating a volume of the raw material heap occlusion part that cannot be shot from the depth sensor in the raw material heap, using at least the point group related to the raw material heap; and calculating a volume of the raw material heap, which is a sum of the calculated volume of the raw material heap non-occlusion part and the estimated volume of the raw material heap occlusion part.

The program can be recorded on a computer-readable storage medium. Also, the storage medium storing the program may be a non-transitory such as a semiconductor memory, a hard disk, a magnetic recording medium, or an optical recording medium. Also, in the present disclosure, it is also possible to implement it as a computer program product. The program is input to a computer apparatus from an input device or from outside via a communication interface; is stored in a storage device; causes a processor to drive according to predetermined steps or processings; can cause to display processing results thereof, including an intermediate state via a display device step by step as necessary; or can cause to communicate with outside via a communication interface. The computer apparatus for that purpose typically comprises: for example, a processor; a storage device; an input device; a communication interface; and, if necessary, a display device, that can be connected to each other via a bus.

According to the first to fourth aspects, it is possible to contribute to measuring a volume of a raw material heap at low cost and efficiently without affecting operation of a factory.

PREFERRAED MODES

Figure 1:
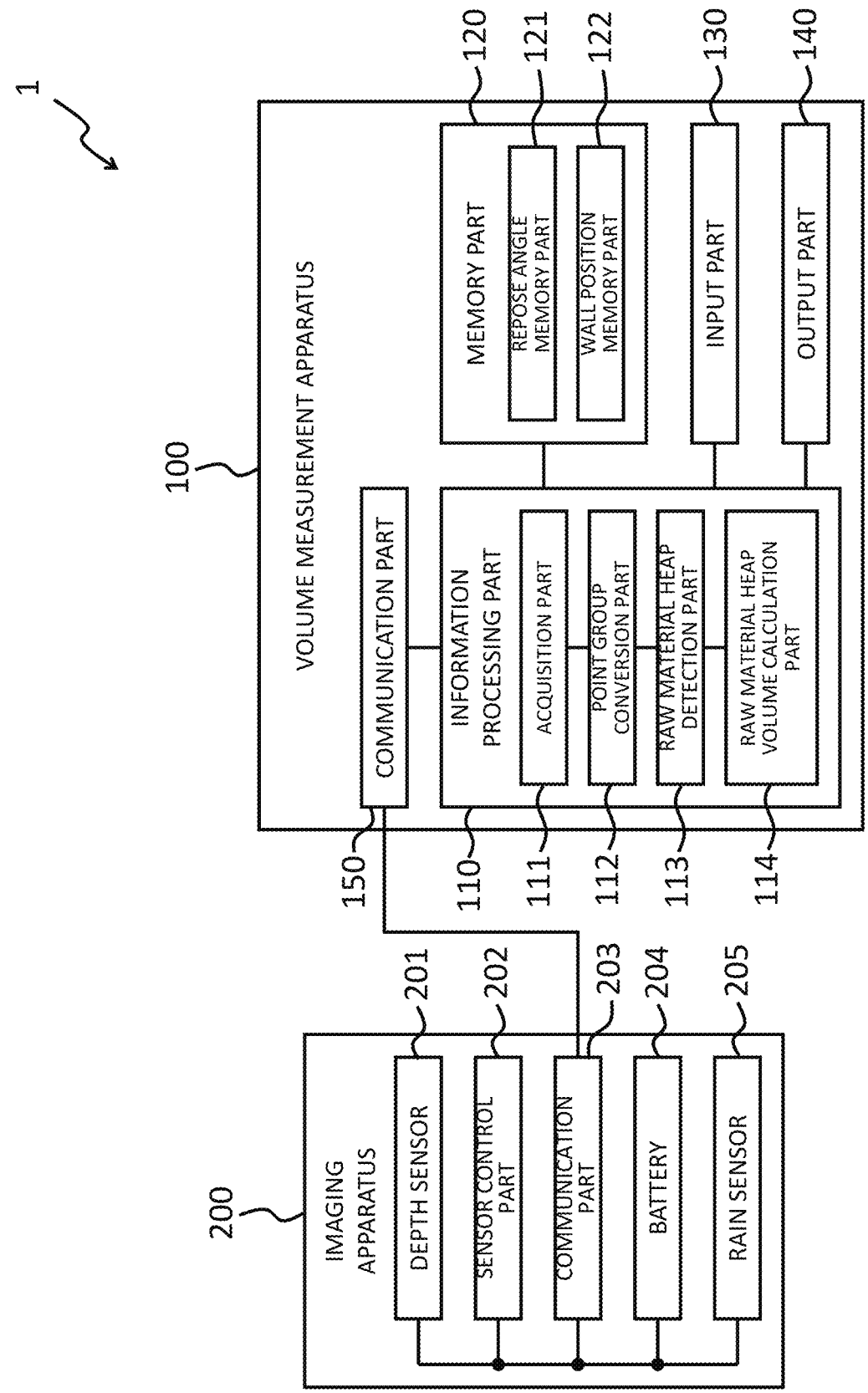
FIG. 1 is a block diagram schematically showing a configuration of a volume measurement system according to a first exemplary embodiment.

In the present disclosure described below, a volume measurement apparatus according to a mode 1 and its deformation mode or modes (termed herein cumulatively as "mode(s)") can be appropriately selected and combined.

The volume measurement apparatus according to the mode 1 can comprise a point group conversion part that converts depth information related to a raw material yard from a depth sensor that shoots the raw material yard having a raw material heap into data of group of points (termed herein as "point group data") related to the raw material yard. The volume measurement apparatus can comprise a raw material heap detection part that detects a point group related to the raw material heap from the point group data related to the raw material yard, using repose angle information related to a repose angle of the raw material heap. The volume measurement apparatus can comprise a raw material heap volume calculation part that calculates a volume of the raw material heap non-occlusion part that can be shot from the depth sensor in the raw material heap based on the point group (i.e., group of points) related to the raw material heap; estimates a volume of the raw material heap occlusion part that cannot be shot from the depth sensor in the raw material heap, using at least the point group related to the raw material heap; and calculates a volume of the raw material heap, which is a sum of the calculated volume of the raw material heap non-occlusion part and the estimated volume of the raw material heap occlusion part.

As a modification mode of the volume measurement apparatus according to the mode 1, when detecting a point group related to the raw material heap, the raw material heap detection part can detect a point group where an angle formed by a plane on a slope of the raw material heap and a ground surface in the raw material yard satisfies the repose angle in the repose angle information, as the point group related to the raw material heap. Also, the volume measurement apparatus can further comprise an acquisition part that acquires the depth information related to the raw material yard from the depth sensor. Also, when converting into the point group data related to the raw material yard, the point group conversion part can convert the depth information related to the raw material yard acquired by the acquisition part into point group data related to the raw material yard. Also, the volume measurement apparatus can further comprise a repose angle memory part that stores repose angle information for rainy weather and repose angle information for non-rainy weather. Also, when detecting the point group related to the raw material heap, the raw material heap detection part can confirm whether or not a rain sensor that detects a rainfall in the raw material yard detects a rainfall; read-out the repose angle information for rainy weather from the repose angle memory part when the rain sensor detects a rainfall; read-out the repose angle information for non-rainy weather from the repose angle memory part when the rain sensor does not detect rainfall; and detect a point group related to the raw material heap from the point group data related to the raw material yard, using the read-out repose angle information for rainy weather or the read-out repose angle information for non-rainy weather. Also, when detecting the point group related to the raw material heap, the raw material heap detection part can measure repose angle information, using image data from a camera, and detect a point group related to the raw material heap from the point group data related to the raw material yard, using the measured repose angle information. Also, when measuring the repose angle information, the raw material heap detection part can create a model in which a texture of a surface of the raw material heap is learned by deep learning from the image data; detect coordinates of the raw material heap, using the created model; and measure the repose angle information from the depth information related to the raw material yard at the coordinates of the detected raw material heap. Also, the raw material heap detection part can further confirm whether or not there is a point group related to an obstacle existing between the raw material heap and the depth sensor in the point group data related to the raw material yard; remove the point group related to the obstacle from the detected point group related to the raw material heap when there is the point group related to the obstacle; and interpolate a point group related to a deficient part in the point group related to the raw material heap, the deficient part being caused by removing the point group related to the obstacle. Also, in a case where the volume of the raw material heap non-occlusion part calculates, the raw material heap volume calculation part can calculate a volume of the raw material heap non-occlusion part based on the point group related to the raw material heap in which the point group related to the deficient part is interpolated by the raw material heap detection part. Also, when interpolating the point group related to the deficient part, the raw material heap detection part can interpolate the point group related to the deficient part, using an image interpolation method. Also, in a case where the volume of the raw material heap non-occlusion part calculates, when the raw material heap detection part does not have the point group related to the obstacle, the raw material heap calculation part can calculate the volume of the raw material heap non-occlusion part based on the point group related to the raw material heap detected by the raw material heap detection part. Also, in a case where the volume of the raw material heap non-occlusion part calculates, the raw material heap volume calculation part can create a convex hull configured of a plurality of tetrahedrons based on a point group related to the raw material heap; calculate a volume of the entire convex hull by calculating a total volume of each of the plurality of tetrahedrons; and define the calculated volume of the entire convex hull as the volume of the raw material heap non-occlusion part. Also, the volume measurement apparatus can further comprise a wall position memory part that stores wall position information related to a wall position in the raw material yard. Also, when estimating the volume of the raw material heap occlusion part, the raw material heap volume calculation part can confirm whether or not there is a wall in the raw material yard, using the point group related to the raw material heap; read-out the wall position information from the wall position memory part when there is a wall(s); and estimate a volume of the raw material heap occlusion part, using the point group related to the raw material heap and the wall position information. Also, when estimating the volume of the raw material heap occlusion part, the raw material heap volume calculation part can cut-out a part corresponding to a distance between an apex of the raw material heap and the wall from the point group related to the raw material heap; create a convex hull configured of a plurality of tetrahedrons based on a point group related to the cut-out part; calculate a volume of the entire convex hull by calculating a total volume of each of the plurality of tetrahedrons; and define the calculated volume of the entire convex hull as the volume of the raw material heap occlusion part. Also, when estimating the volume of the raw material heap occlusion part, when there is no wall, the raw material heap volume calculation part can estimate a volume of the raw material heap occlusion part, using the point group related to the raw material heap.

In the present disclosure, a volume measurement system according to a mode 2 can comprise: a depth sensor shooting a raw material yard having a raw material heap; and a volume measurement apparatus according to the mode 1.

In the present disclosure, a volume measurement method according to a mode 3 can comprise converting depth information related to a raw material yard from a depth sensor that shoots the raw material yard having a raw material heap into point group data related to the raw material yard. Also, the volume measurement method can comprise detecting a point group related to the raw material heap from the point group data related to the raw material yard, using repose angle information related to a repose angle of the raw material heap. Also, the volume measurement method can comprise calculating a volume of the raw material heap non-occlusion part that can be shot from the depth sensor in the raw material heap based on the point group related to the raw material heap; estimating a volume of the raw material heap occlusion part that cannot be shot from the depth sensor in the raw material heap, using at least the point group related to the raw material heap; and calculating a volume of the raw material heap, which is a sum of the calculated volume of the raw material heap non-occlusion part and the estimated volume of the raw material heap occlusion part.

In the present disclosure, a program according to a mode 4 can cause hardware resources to execute converting depth information related to a raw material yard from a depth sensor that shoots the raw material yard having a raw material heap into point group data related to the raw material yard. Also, the program can cause hardware resources to execute detecting a point group related to the raw material heap from the point group data related to the raw material yard, using repose angle information related to a repose angle of the raw material heap. Also, the program can cause hardware resources to execute processings comprising: calculating a volume of the raw material heap non-occlusion part that can be shot from the depth sensor in the raw material heap based on the point group related to the raw material heap; estimating a volume of the raw material heap occlusion part that cannot be shot from the depth sensor in the raw material heap, using at least the point group related to the raw material heap; and calculating a volume of the raw material heap, which is a sum of the calculated volume of the raw material heap non-occlusion part and the estimated volume of the raw material heap occlusion part.

Hereinafter, exemplary embodiments will be described with reference to drawings. When drawing-reference signs are attached in this application, they are solely for the purpose of assisting understanding, and are not intended to be limited to the illustrated modes. Also, the following exemplary embodiments are merely examples, and do not limit the present invention. Further, connecting lines between blocks such as drawings referred to in the following description includes both bidirectional and unidirectional. A one-way arrow schematically shows a flow of a main signal (data), and does not exclude bidirectionality. Furthermore, in circuit diagrams, block diagrams, internal configuration diagrams, connection diagrams, etc. shown in the disclosure of the present application, although explicit disclosure is omitted, an input port and an output port exist at the input end and the output end of each connection line, respectively. The same applies to the input/output interface. A program is executed via a computer apparatus, which comprises, for example, a processor, a storage device, an input device, a communication interface, and a display device as required, and the computer apparatus is configured to be able to communicate with inside device(s) or external apparatus(es) (including computer(s)) via a communication interface regardless of whether it is wired or wireless.

First Exemplary Embodiment

Figure 2:
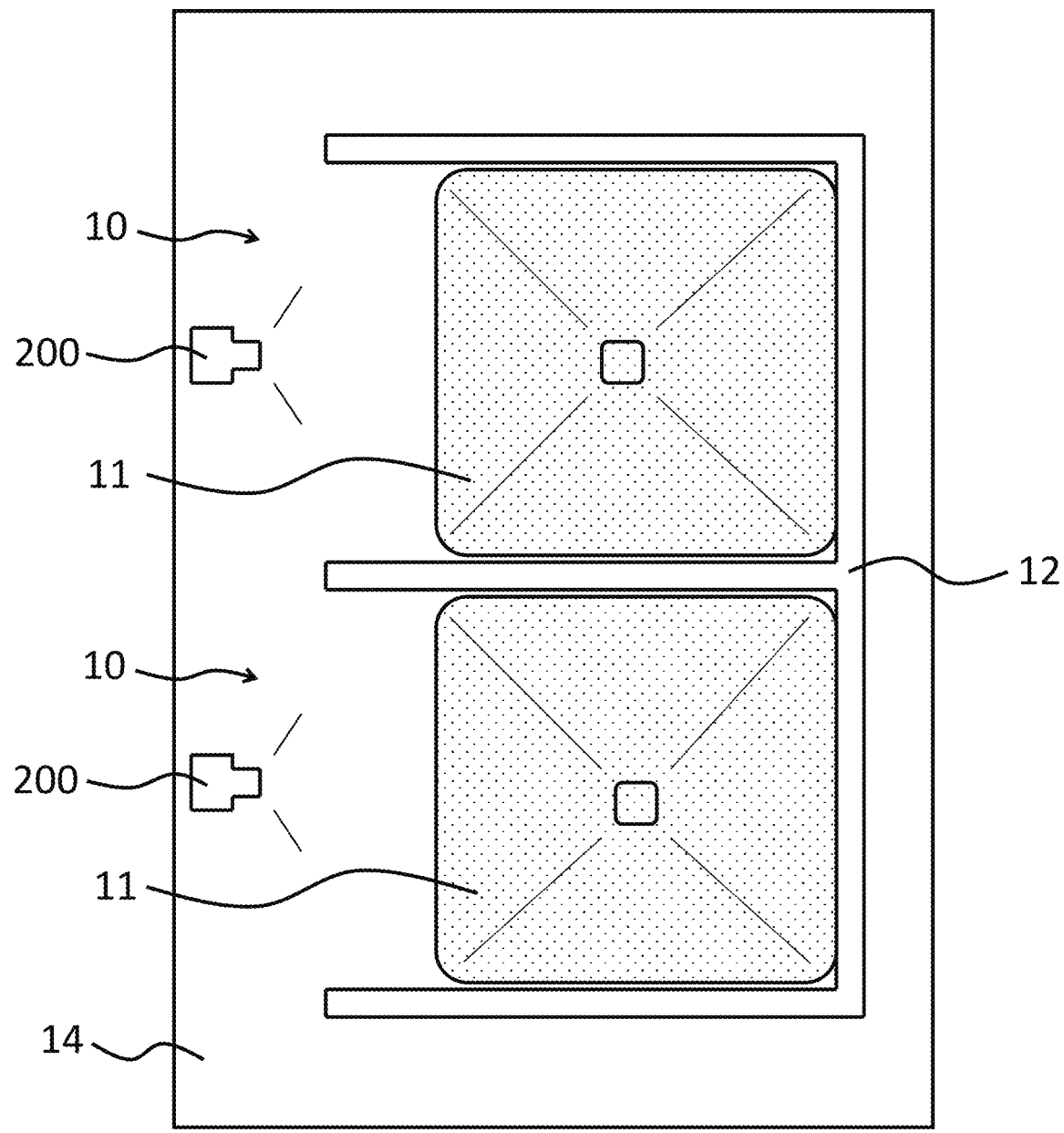
FIG. 2 is an image diagram schematically showing an example of a state in which an imaging apparatus in the volume measurement system according to the first exemplary embodiment is placed in a raw material yard.

A volume measurement system according to a first exemplary embodiment will be described with reference to the drawings. FIG. 1 is a block diagram schematically showing a configuration of the volume measurement system according to the first exemplary embodiment. FIG. 2 is an image diagram schematically showing an example of a state in which the imaging apparatus in the volume measurement system according to the first exemplary embodiment is placed at the raw material yard.

The volume measurement system 1 is a system measuring a volume of a raw material heap (11 in FIG. 2) in a raw material yard (10 in FIG. 2) (see FIG. 1). The volume measurement system 1 comprises a volume measurement apparatus 100 and an imaging apparatus 200.

Here, although there are two raw material yards 10 in FIG. 2, the present invention is not limited to this. In each of raw material yards 10, a raw material heap 11 is placed on a ground surface 14, and three sides of the raw material heap 11 are surrounded by walls 12 installed on the ground surface 14. A shape of the raw material heap 11 does not have to be an ideal conical shape, and the raw material heap 11 may be uneven with concave and convex portions.

The volume measurement apparatus 100 is an apparatus that automatically measures (manages) a volume of a raw material heap (11 in FIG. 2) in a raw material yard (10 in FIG. 2), using the imaging apparatus 200 that shoots (captures image(s) of) a raw material yard (10 in FIG. 2) (see FIG. 1). As the volume measurement apparatus 100, for example, hardware resources comprising a processor, a memory, a network interface, and the like (for example, an information processing apparatus, a computer) can be used. The volume measurement apparatus 100 comprises: an information processing part 110; a memory part 120; an input part 130, an output part 140, and a communication part 150.

The information processing part 110 is a functional part that processes information (see FIG. 1). The information processing part 110 is communicatably connected to the memory part 120, the input part 130, the output part 140, and the communication part 150. The information processing part 110 comprises: an acquisition part 111; a point group conversion part 112; a raw material heap detection part 113; and a raw material heap volume calculation part 114. As the information processing part 110, for example, a processor such as a CPU (Central Processing part) or an MPU (Micro Processor Unit) can be used. In this case, by the information processing part 110 executing a program while using the memory part 120 that stores the program, virtually, the acquisition part 111, the point group conversion part 112, the raw material heap detection part 113, and the raw material heap volume calculation part 114 may be configured.

The acquisition part 111 is a processing part that acquires (collects) the depth information (depth information related to the raw material yard (10 in FIG. 2); three-dimensional data) generated by the depth sensor 201 of the imaging apparatus 200 (see FIG. 1).

The point group conversion part 112 is a processing part that converts depth information (depth information related to the raw material yard (10 in FIG. 2)) acquired by the acquisition part 111 into point group data (point group data related to a raw material yard (10 in FIG. 2)) (see FIG. 1).

The raw material heap detection part 113 is a processing part that detects (extracts) a point group related to the raw material heap (11 in FIG. 2) from the point group data (point group data related to the raw material yard (10 in FIG. 2)) converted by the point group conversion part 112 (see FIG. 1).

The raw material heap detection part 113 executes a processing of confirming whether or not a rain sensor 205 of the imaging apparatus 200 has detected rainfall. When the raw material yard (10 in FIG. 2) is indoors and is not affected by rainfall, the raw material heap detection part 113 can omit the processing of confirming of the rainfall detection.

The raw material heap detection part 113 executes a processing of reading repose angle information from the repose angle memory part 121. When the rain sensor 205 does not detect rainfall, the raw material heap detection part 113 reads-out repose angle information for non-rainy weather from the repose angle memory part 121. When the rain sensor 205 detects rainfall, the raw material heap detection part 113 reads-out repose angle information for rainy weather from the repose angle memory part 121. When a raw material yard (10 in FIG. 2) is indoors and the processing of confirming of rainfall detection is omitted, the raw material heap detection part 113 reads-out the repose angle information for non-rainy weather from the repose angle memory part 121.

The raw material heap detection part 113 executes a processing of detecting the point group (i.e., group of points) related to the raw material heap 11 from the point group data (the point group data related to the raw material yard (10 in FIG. 2)) converted by the point group conversion part 112, using the repose angle information (the repose angle information for non-rainy weather or the repose angle information for rainy weather) read-out from the repose angle memory part 121.

Figure 6:
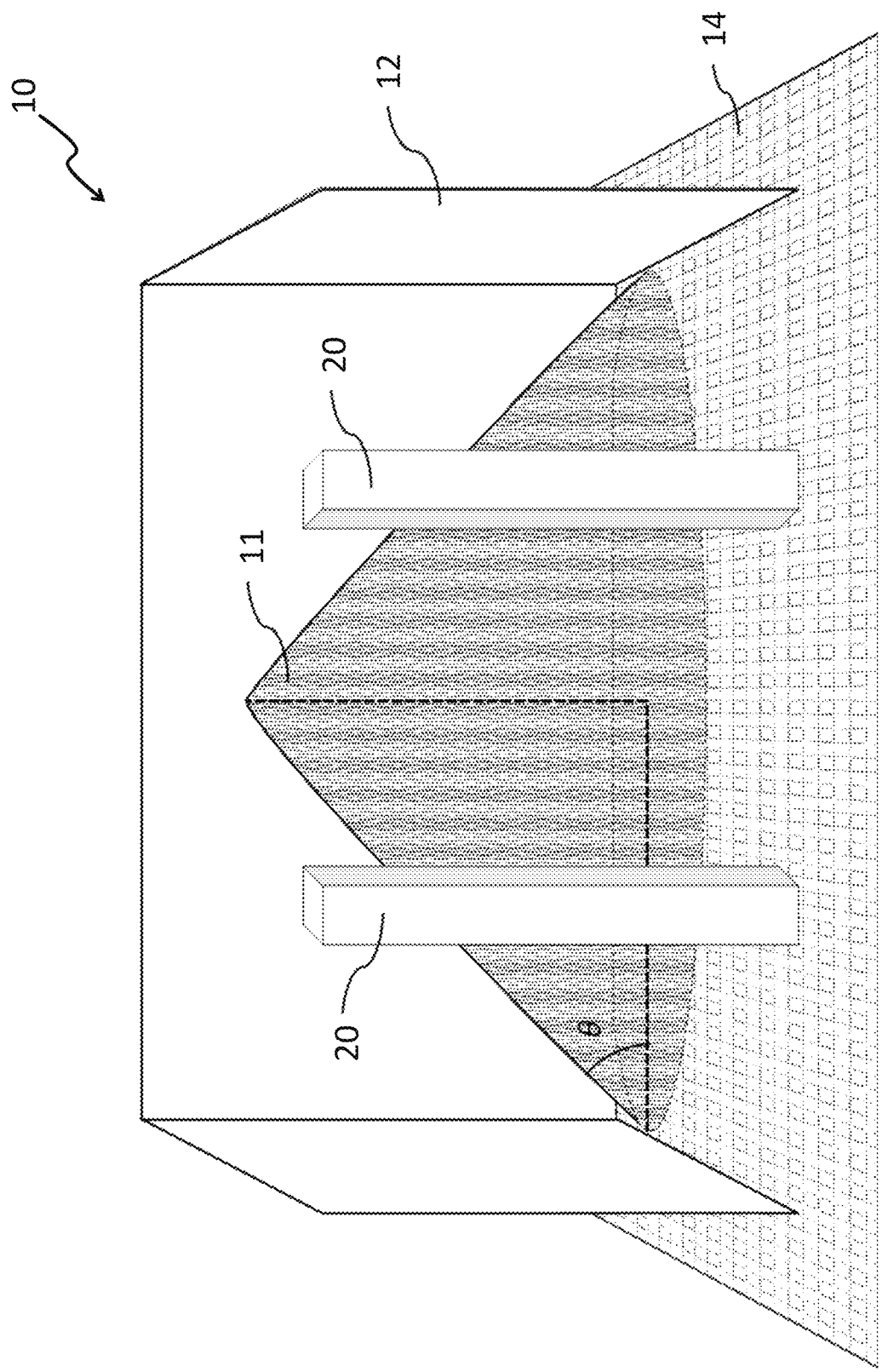
FIG. 6 is an image diagram schematically showing an example of point group data in a state where there is an obstacle in a raw material yard when viewed from an imaging position of the imaging apparatus in the volume measurement system according to the first exemplary embodiment.

The raw material heap detection part 113 executes a processing of confirming whether or not there is a point group related to an obstacle(s) (20 in FIG. 6; for example, a pillar(s)) between the raw material heap (11 in FIG. 2) and the imaging apparatus 200 in the point group data (point group data related to the raw material yard (10 in FIG. 2)) converted by the point group conversion part 112. When there is no obstacle(s) (20 in FIG. 6) between the raw material heap (11 in FIG. 2) and the imaging apparatus 200, the raw material heap detection part 113 can omit the processing of confirming an existence of a point group relates to an obstacle(s) (20 in FIG. 6).

When the point group(s) related to the obstacle(s) (20 in FIG. 6) exists, the raw material heap detection part 113 removes the point group(s) related to the obstacle(s) (20 in FIG. 6) from the detected point group related to the raw material heap 11; and interpolates a point group(s) of a deficient part(s) (17 in FIG. 7) formed by removing the point group(s) related to the obstacle(s) (20 in FIG. 6) in the point group related to the raw material heap 11. When a point group related to an obstacle (20 in FIG. 6) does not exist, the raw material heap detection part 113 does not perform the processings of removing and interpolating. "Interpolation" means to calculate a value of a non-measured part based on a value of a part obtained by measurement.

The raw material heap volume calculation part 114 is a processing part that calculates a volume (remaining amount of raw material) of the raw material heap (11 in FIG. 2) (see FIG. 1).

The raw material heap volume calculation part 114 executes a processing of calculating a volume of a raw material heap non-occlusion part(s) (11a in FIG. 8) in the raw material heap (11 of FIG. 2) based on the point group(s) (detected point group(s) or interpolated point group(s)) related to the raw material heap. Here, the raw material heap non-occlusion part 11a is a part of the raw material heap 11 that does not become an occlusion (a part that can be shot (appeared) from the depth sensor 201).

The raw material heap volume calculation part 114 executes a processing of confirming whether or not a wall exists, using the point group(s) (detected point group(s) or interpolated point group(s)) related to the raw material heap. When the wall exists, the raw material heap volume calculation part 114 executes a processing of reading-out wall position information from the wall position memory part 122. When the wall does not exist, the raw material heap volume calculation part 114 does not read-out wall position information from the wall position memory part 122. If s wall does not exist from the beginning, the raw material heap volume calculation part 114 can omit a processing of confirming an existence of a wall and a processing of reading-out wall position information.

The raw material heap volume calculation part 114 executes a processing of estimating a volume of a raw material heap occlusion part (11b in FIG. 8) in a raw material heap (11 in FIG. 2), using at least the point group related to the raw material heap (detected point group or interpolated point group). When the wall exists, the raw material heap volume calculation part 114 estimates a volume of a raw material heap occlusion part (11b in FIG. 8) in a raw material heap (11 in FIG. 2), using the read wall position information further.

Figure 8:
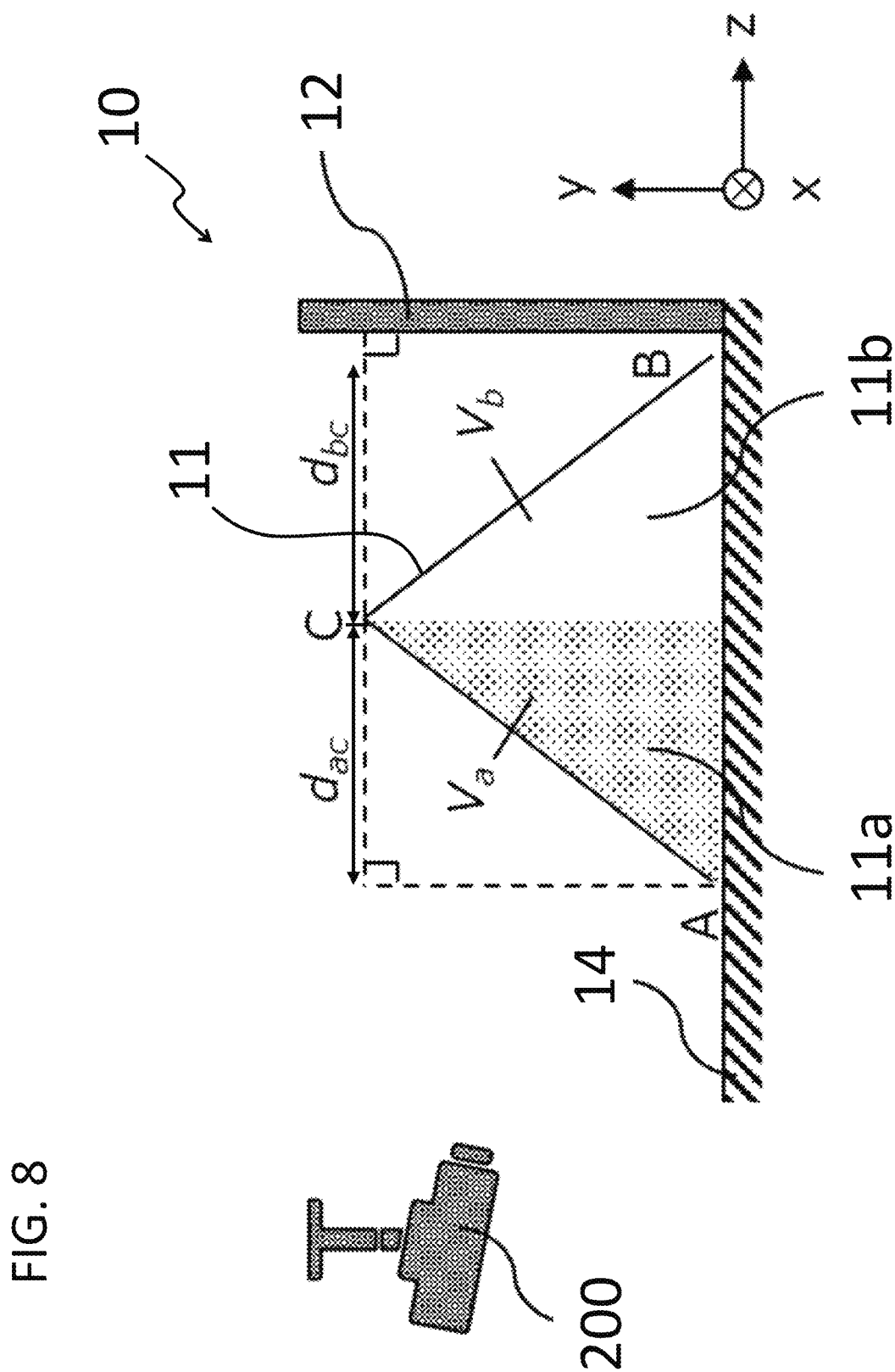
FIG. 8 is an image diagram schematically showing an example of a state when the raw material yard shot by the imaging apparatus in the volume measurement system according to the first exemplary embodiment is viewed from a side.

The raw material heap volume calculation part 114 executes a processing of calculating a remaining amount (volume) of the raw material heap (11 of FIG. 2) which is a sum of the calculated volume of the raw material heap non-occlusion part(s) (11a in FIG. 8) and the estimated volume of the raw material heap occlusion part (11b in FIG. 8).

The memory part 120 is a functional part that stores information such as data and programs (see FIG. 1). The memory part 120 comprises a repose angle memory part 121 and a wall position memory part 122.

The repose angle memory part 121 stores information (repose angle information) related to a repose angle of a raw material heap (11 in FIG. 2). The repose angle information includes a piece of repose angle information for non-rainy weather and a piece of repose angle information for rainy weather. A repose angle is an angle between a slope of a heap of particles that is formed when particles are dropped from a certain height and remain stable without spontaneously collapsing and a horizontal plane. The repose angle can be obtained by measuring an angle between a slope of a raw material heap (11 in FIG. 2) deposited on a flat place and the flat surface (horizontal plane). Although the repose angle is determined by a size of raw material particles, a roundness and shape of corners of the particles, etc., since it is also greatly affected by a water content, as the repose angle information, repose angle information for non-rainy weather and rainy weather, respectively are prepared. Inputting of the repose angle information to the repose angle memory part 121 can be performed from the input part 130. When a raw material yard (10 in FIG. 2) is located indoors and is not affected by rainfall, the repose angle information for rainy weather can be omitted.

The wall position memory part 122 stores information (wall position information) related to a position of a wall(s) (12 in FIG. 2) in a raw material yard (10 in FIG. 2). The wall position information may be obtained from a design information of a raw material yard (10 in FIG. 2), or may be obtained by measuring, using a measuring instrument such as a laser distance meter. Inputting of the wall position information to the wall position memory part 122 can perform from the input part 130. When a wall (12 in FIG. 2) does not originally exist in a raw material yard (10 in FIG. 2), the wall position memory part 122 can be omitted.

The input part 130 is a functional part that inputs (receives) information by an operation of an operator (see FIG. 1). As the input part 130, for example, a keyboard, mouse, touch panel, microphone, button, or other input means can be used, and an information terminal or the like comprising an input part communicatably connected via a communication part (not shown) can be used.

The output part 140 is a functional part that displays a measured volume of a raw material heap and the like (see FIG. 1). As the output part 140, for example, a display for displaying, a printer for printing, or other output means can be used, and an information terminal or the like comprising an output part communicatably connected via a communication part (not shown) can be used. Also, instead of using the output part 140, information may be output, using another information terminal or the like (not shown; for example, a terminal used by an user) connected through a communication part and a network.

The communication part 150 is a functional part that communicatably (wireless-communicatably, wired-communicatably) connects with the communication part 203 of the imaging apparatus 200. The communication part 150 may be communicatably connected to the communication part 203 of the imaging apparatus 200 via a network (not shown).

The imaging apparatus 200 is an apparatus that shoots a subject (see FIG. 1). The imaging apparatus 200 is placed so as to be able to overlook at least one raw material yard (10 in FIG. 2). The imaging apparatus 200 may be placed so as to shoot a raw material yard (10 in FIG. 2) from above. The imaging apparatus 200 may be placed in each of raw material yards 10 as shown in FIG. 2. The imaging apparatus 200 comprises: a depth sensor 201; a sensor control part 202; a communication part 203; a battery 204; and a rain sensor 205.

The depth sensor 201 is a sensor that shoots a subject and generates depth information as three-dimensional data (see FIG. 1). As the depth sensor 201, for example, a laser scanner, a 2D laser distance meter, a stereo camera, a ToF (Time of Flight) sensor, a LiDAR (Light Detection and Ranging) sensor, or the like can be used. Although the depth sensor 201 is preferably one in the imaging apparatus 200, it may be two or more.

The sensor control part 202 is a functional part that controls the depth sensor 201 (see FIG. 1).

The communication part 203 is a functional part that communicatably (wireless-communicatably, wired-communicatably) connect to the communication part 150 of the volume measurement apparatus 100 (see FIG. 1). The communication part 203 may be communicatably connected to the communication part 150 of the volume measurement apparatus 100 via a network (not shown).

The battery 204 is a drive power source for the imaging apparatus 200 (see FIG. 1). An external power source (not shown) may be used instead of the battery 204.

The rain sensor 205 is a sensor that detects rainfall (see FIG. 1). Instead of the rain sensor 205, a rainfall confirmation part (not shown) that acquires weather information via an internet to confirm presence or absence of rainfall may be used. Also, without using the rain sensor 205, an operator may confirm presence or absence of rainfall; operate the input part 130 of the volume measurement apparatus 100; and select the repose angle information (repose angle information for non-rainy weather or repose angle information for non-rainy weather) in the repose angle memory part 121.

Figure 3:
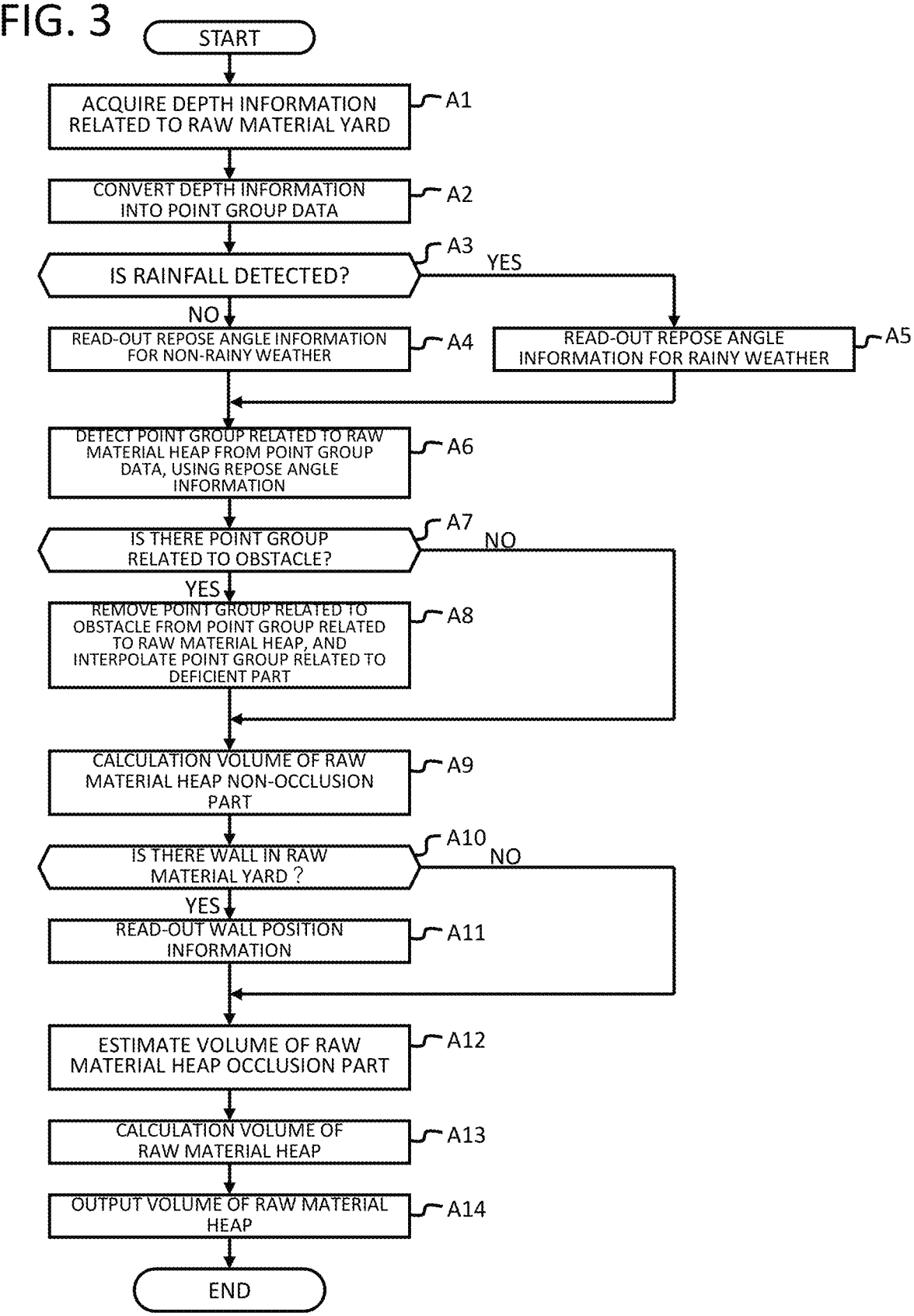
FIG. 3 is a flowchart schematically showing an operation of an information processing part of the volume measurement apparatus in the volume measurement system according to the first exemplary embodiment.
Figure 4:
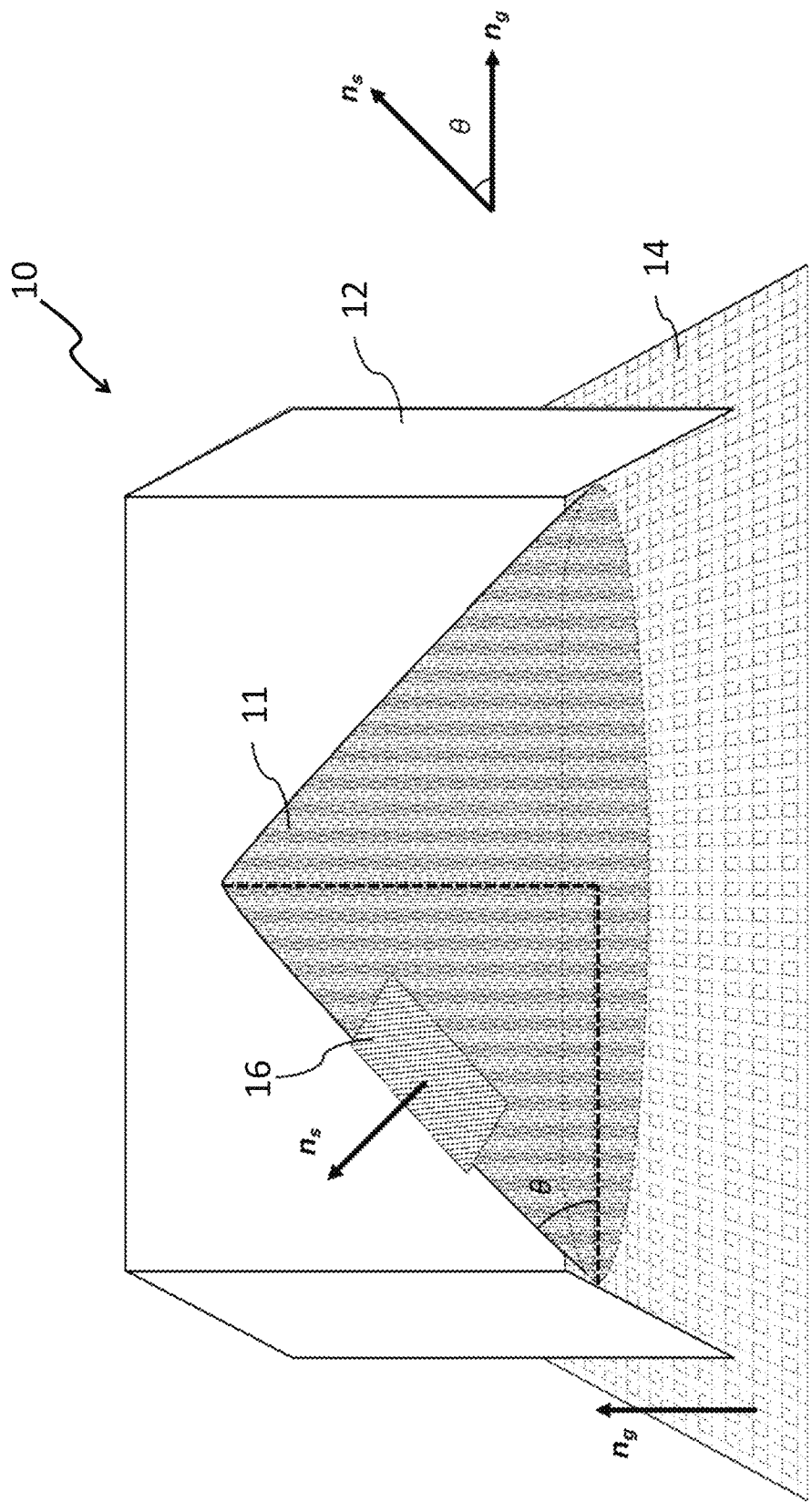
FIG. 4 is an image diagram schematically showing an example of point group data related to a raw material yard when viewed from an imaging position of the imaging apparatus in the volume measurement system according to the first exemplary embodiment.
Figure 5:
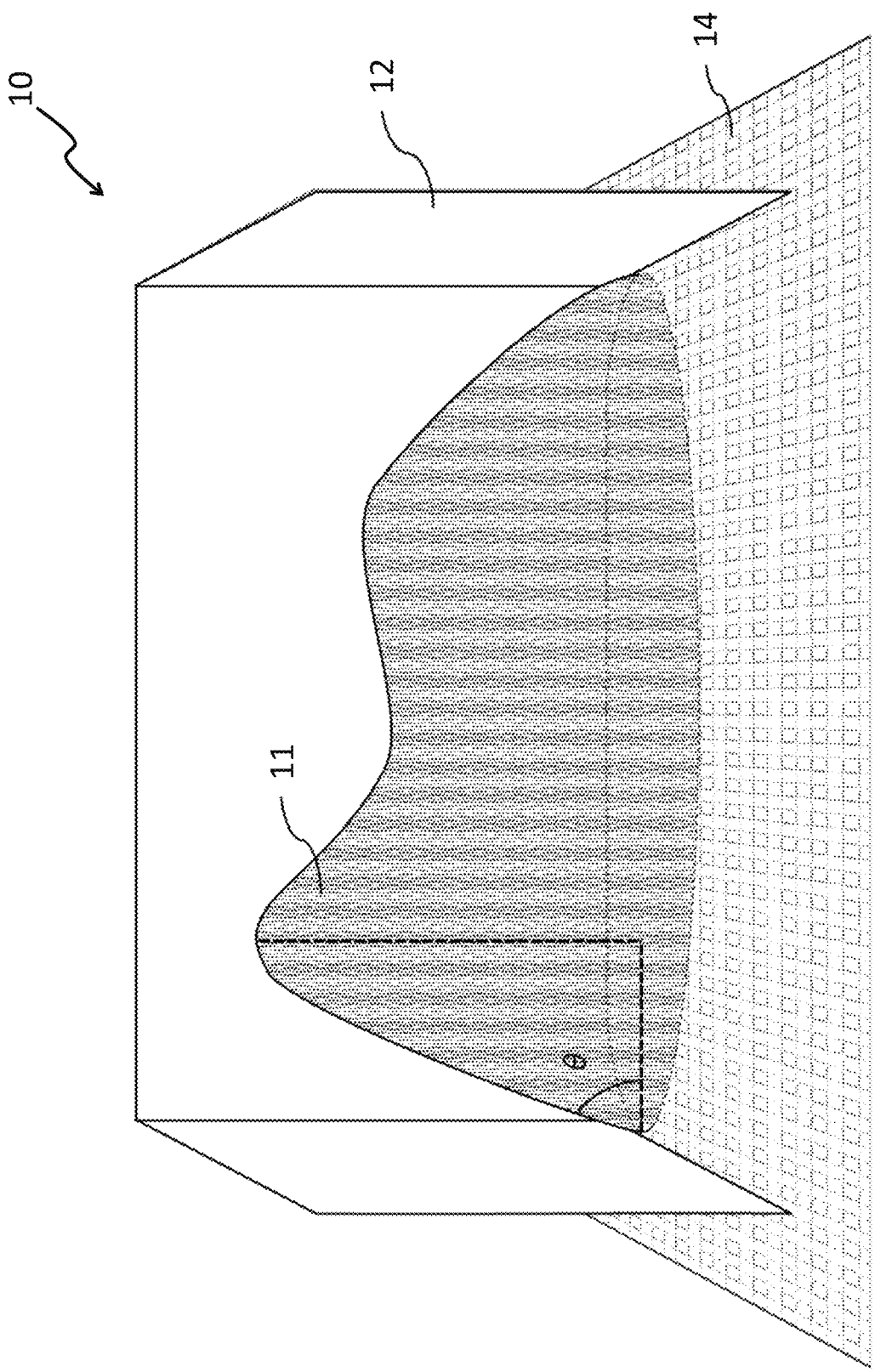
FIG. 5 is an image diagram schematically showing another example of point group data related to a raw material yard when viewed from an imaging position of the imaging apparatus in the volume measurement system according to the first exemplary embodiment.
Figure 7:
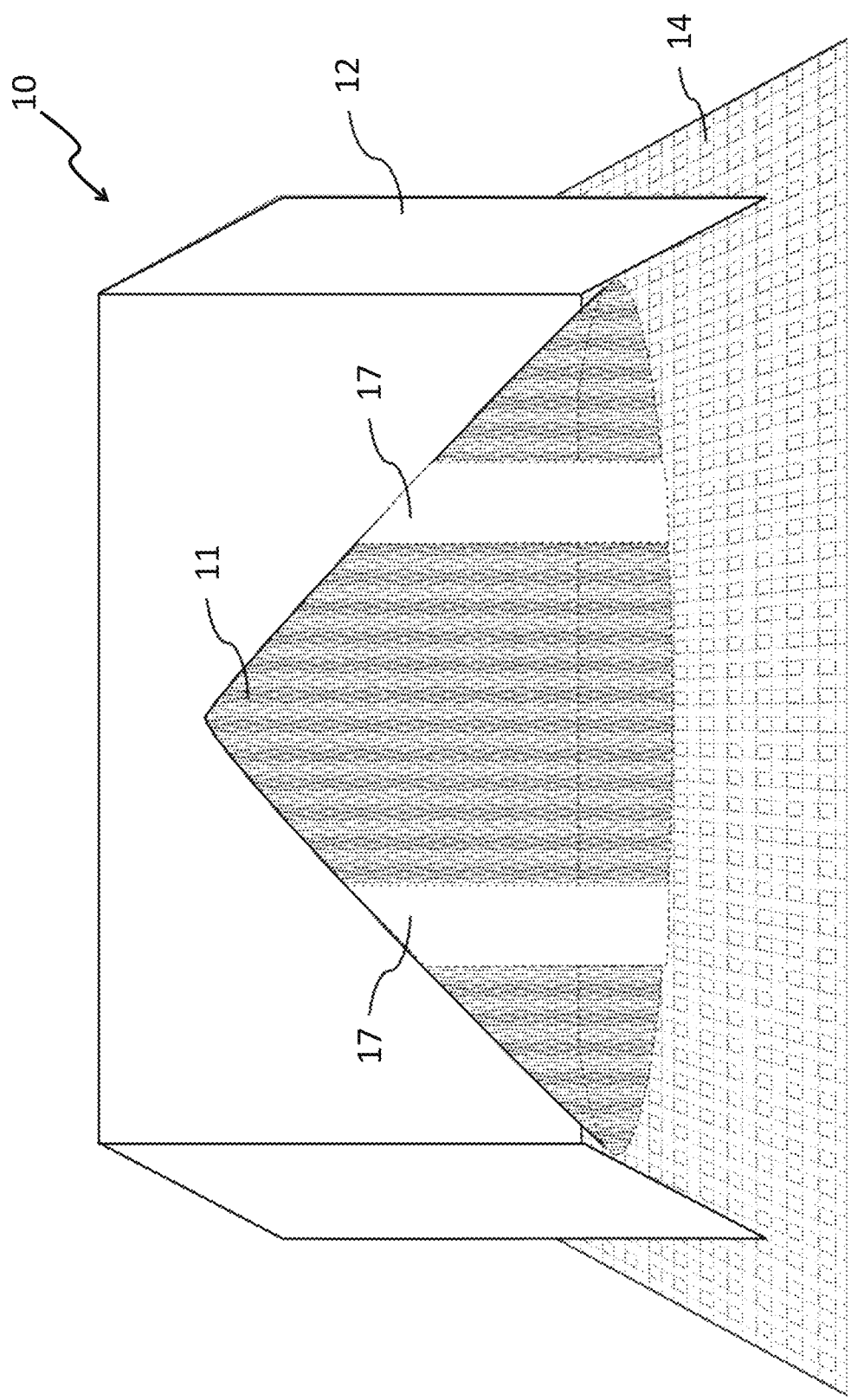
FIG. 7 is an image diagram schematically showing an example of point group data related to a state in which the obstacle is removed from the raw material yard when viewed from the imaging position of the imaging apparatus in the volume measurement system according to the first exemplary embodiment.
Figure 9:
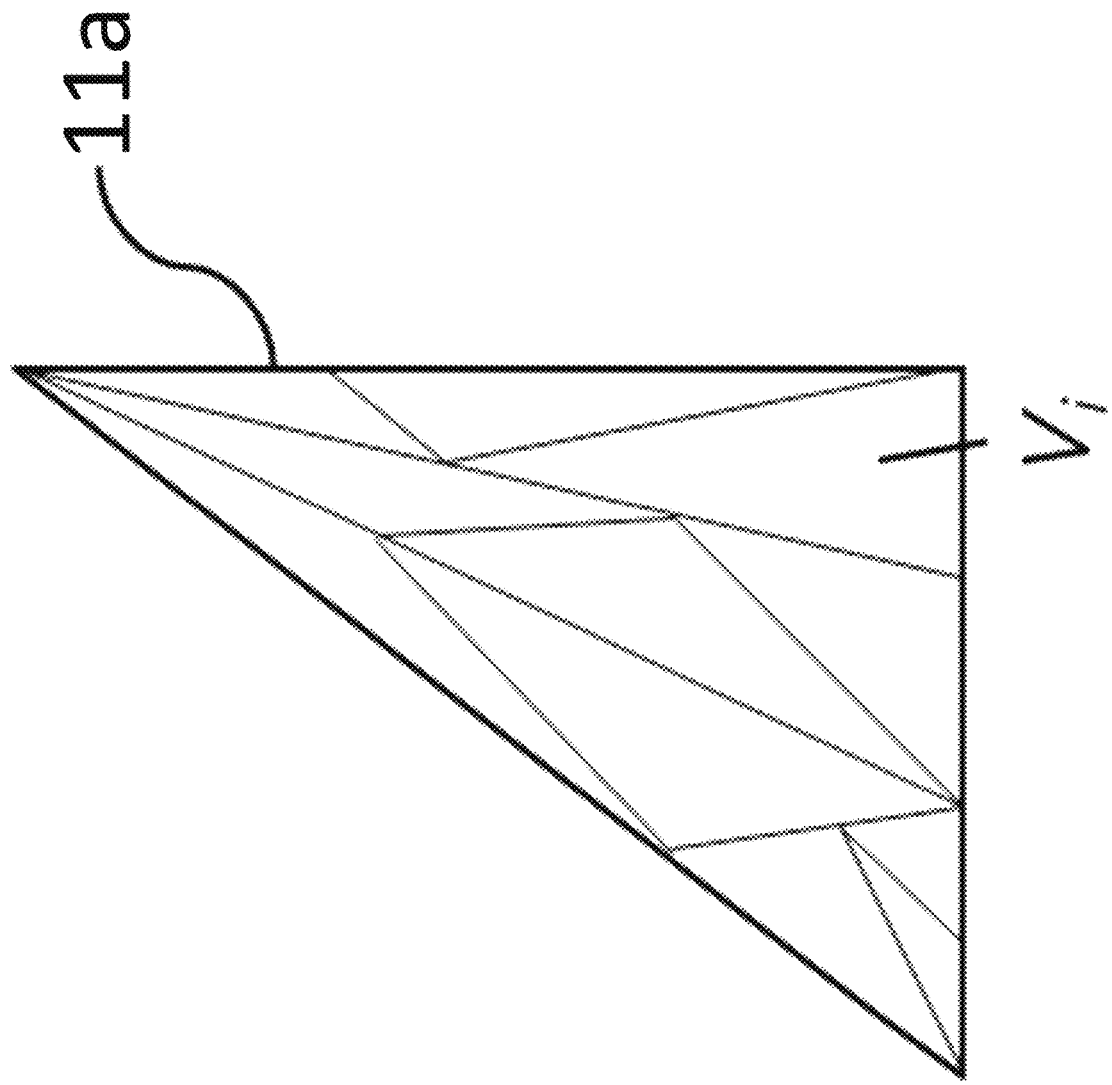
FIG. 9 is an image diagram schematically showing an example of a state when a convex hull created by the information processing part of the volume measurement apparatus in the volume measurement system according to the first exemplary embodiment is viewed from the side.
Figure 10:
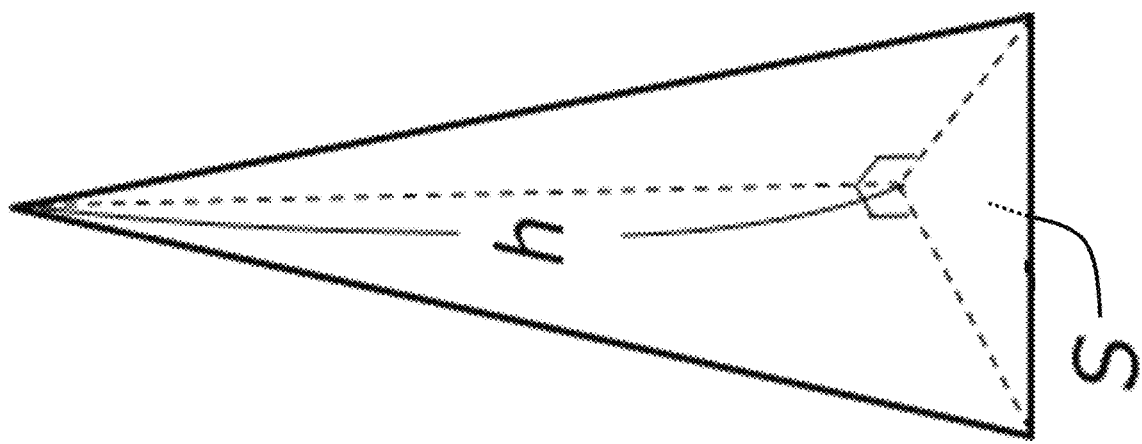
FIG. 10 is an image diagram schematically showing an example of one tetrahedron extracted from the convex hull created by the information processing part of the volume measurement apparatus in the volume measurement system according to the first exemplary embodiment.
Figure 11:
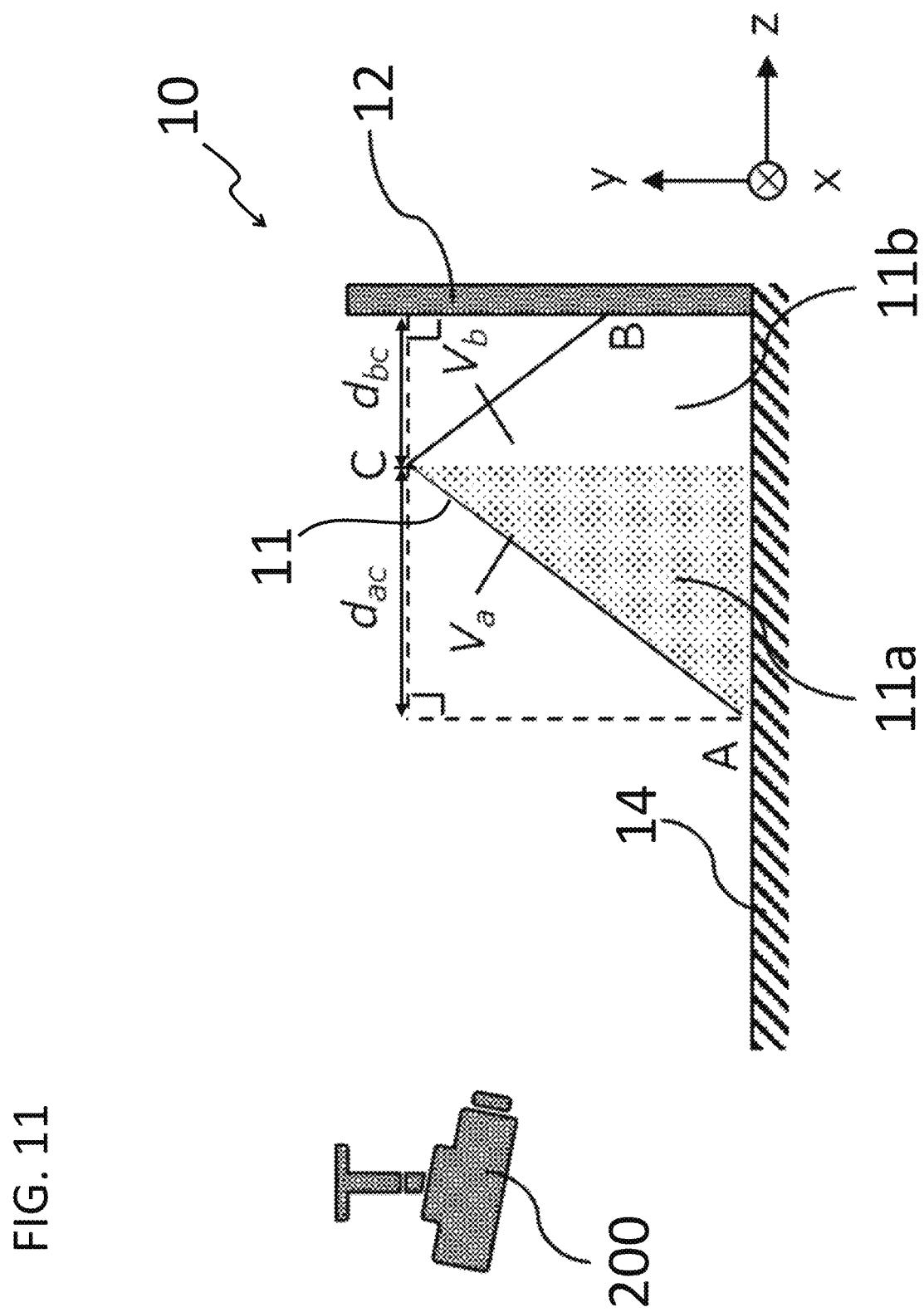
FIG. 11 is an image diagram schematically showing another example of the state when the raw material yard shot by the imaging apparatus in the volume measurement system according to the first exemplary embodiment is viewed from the side.
Figure 12:
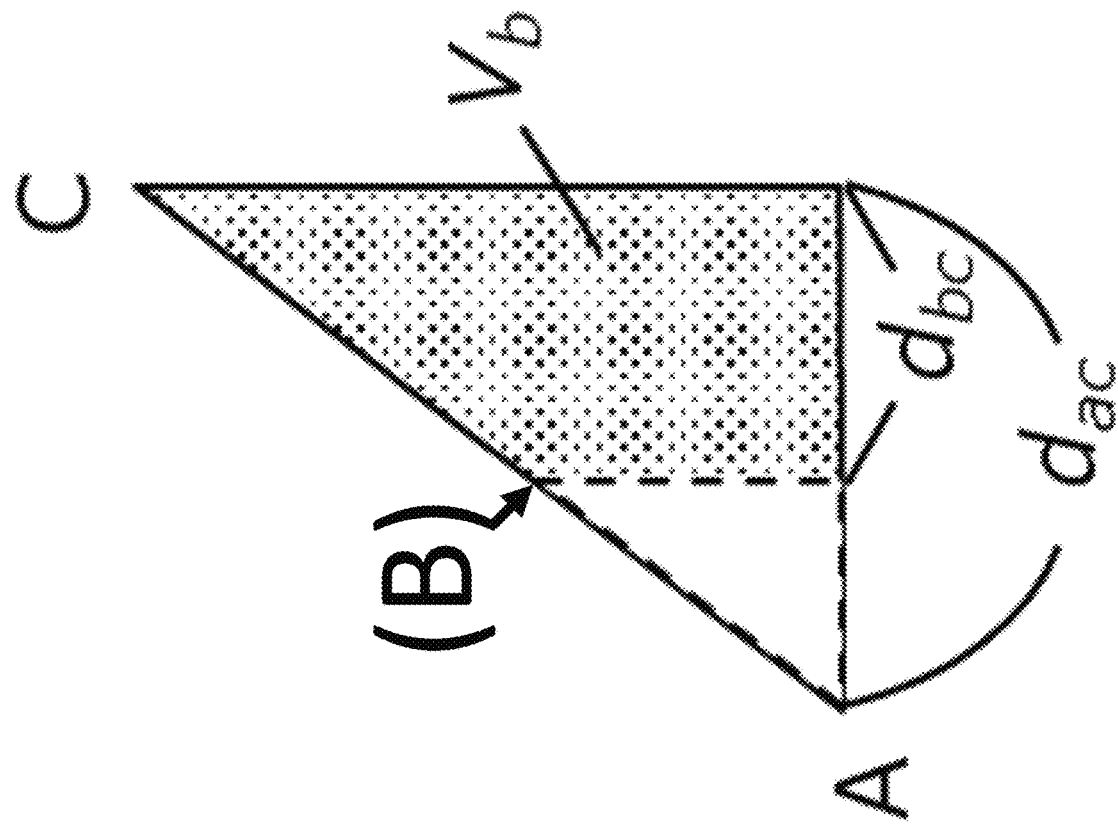
FIG. 12 is an image diagram when the raw material heap non-occlusion part of another example in the state at which the raw material yard shot by the imaging apparatus in the volume measurement system according to the first exemplary embodiment is viewed from the side is cropped.
Figure 13:
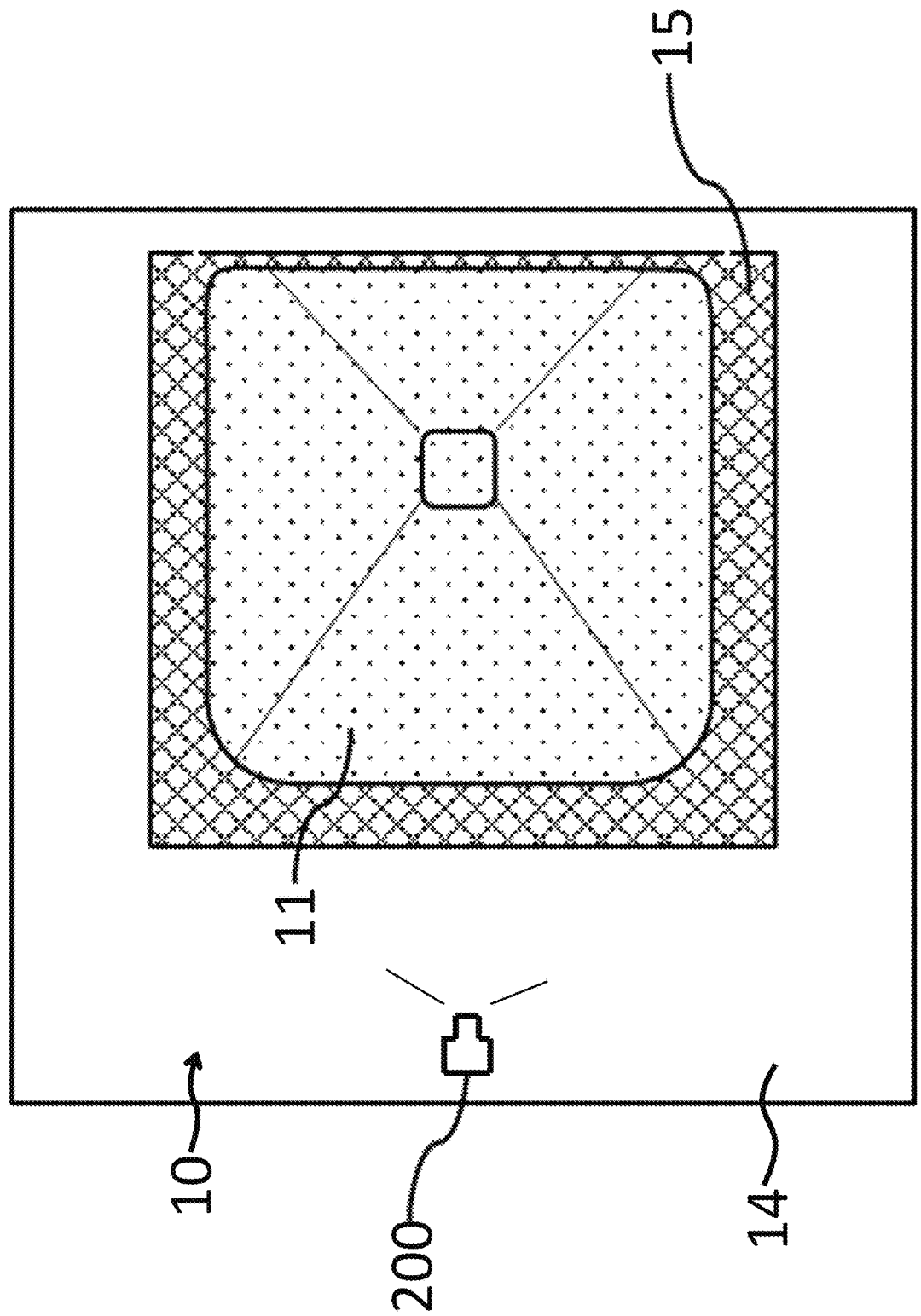
FIG. 13 is an image diagram schematically showing another example of a state when the imaging apparatus in the volume measurement system according to the first exemplary embodiment is arranged in a raw material yard.

Next, an operation of the information processing part of the volume measurement apparatus in the volume measurement system according to the first exemplary embodiment will be described with reference to the drawings. FIG. 3 is a flowchart schematically showing an operation of an information processing part of the volume measurement apparatus in the volume measurement system according to the first exemplary embodiment. FIG. 4 is an image diagram schematically showing an example of point group data related to a raw material yard when viewed from an imaging position of the imaging apparatus in the volume measurement system according to the first exemplary embodiment. FIG. 5 is an image diagram schematically showing another example of point group data related to a raw material yard when viewed from an imaging position of the imaging apparatus in the volume measurement system according to the first exemplary embodiment. FIG. 6 is an image diagram schematically showing an example of point group data in a state where there is an obstacle in a raw material yard when viewed from an imaging position of the imaging apparatus in the volume measurement system according to the first exemplary embodiment. FIG. 7 is an image diagram schematically showing an example of point group data related to a state in which the obstacle is removed from the raw material yard when viewed from the imaging position of the imaging apparatus in the volume measurement system according to the first exemplary embodiment. FIG. 8 is an image diagram schematically showing an example of a state when the raw material yard shot by the imaging apparatus in the volume measurement system according to the first exemplary embodiment is viewed from a side. FIG. 9 is an image diagram schematically showing an example of a state when a convex hull created by the information processing part of the volume measurement apparatus in the volume measurement system according to the first exemplary embodiment is viewed from the side. FIG. 10 is an image diagram schematically showing an example of one tetrahedron extracted from the convex hull created by the information processing part of the volume measurement apparatus in the volume measurement system according to the first exemplary embodiment. FIG. 11 is an image diagram schematically showing another example of the state when the raw material yard shot by the imaging apparatus in the volume measurement system according to the first exemplary embodiment is viewed from the side. FIG. 12 is an image diagram when the raw material heap non-occlusion part of another example in the state when the raw material yard shot by the imaging apparatus in the volume measurement system according to the first exemplary embodiment is viewed from the side is cropped. FIG. 13 is an image diagram schematically showing another example of a state when the imaging apparatus in the volume measurement system according to the first exemplary embodiment is arranged in a raw material yard. Please refer to FIG. 1 as to the configuration of the volume measurement system.

As a premise, it is assumed that information (wall position information) relating to a position of the wall(s) 12 in a raw material yard (10 in FIG. 2) is stored in the wall position memory part 122 in advance. Also, it is assumed that information related to a repose angle of the raw material heap 11 (repose angle information) is also stored in advance in the repose angle memory part 121.

First, the acquisition part 111 of the information processing part 110 of the volume measurement apparatus 100 acquires depth information related to a raw material yard (10 in FIG. 2) generated by the depth sensor 201 of the imaging apparatus 200 (see Step A1 in FIG. 3).

Next, the point group conversion part 112 of the information processing part 110 of the volume measurement apparatus 100 converts the depth information acquired by the acquisition part 111 into point group data (point group data related to a raw material yard (10 in FIG. 2)) (see Step A2 in FIG. 3).

Next, the raw material heap detection part 113 of the information processing part 110 of the volume measurement apparatus 100 confirms whether or not the rain sensor 205 has detected rainfall (see Step A3 in FIG. 3).

When rainfall is not detected (NO in Step A3), the raw material heap detection part 113 reads-out repose angle information for non-rainy weather from the repose angle memory part 121 (see Step A4 in FIG. 3).

When rainfall is detected (YES in Step A3), the raw material heap detection part 113 reads-out repose angle information for rainy weather from the repose angle memory part 121 (see Step A5 in FIG. 3).

After Step A4 or Step A5, the raw material heap detection part 113 detects (extracts) a point group related to the raw material heap (11 of FIG. 4) from the point group data of the raw material yard (10 of FIG. 2) converted by the point group conversion part 112, using the repose angle information (repose angle information for non-rainy weather or repose angle information for rainy weather) read from the repose angle memory part 121 (see Step A6 of FIG. 3).

Next, the raw material heap detection part 113 confirms whether or not there is a point group related to an obstacle(s) (20 in FIG. 6; for example, a pillar) between the raw material heap (11 in FIG. 2) and the imaging apparatus (200 in FIG. 2) in the point group data related to the raw material yard (10 in FIG. 2) converted by the point group conversion part 112 (see Step A7 in FIG. 3). When there is no point group related to the obstacle(s) (20 in FIG. 6) (NO in Step A7), the process proceeds to Step A9.

When there is a point group related to the obstacle(s) (20 in FIG. 6) (YES in Step A7), the raw material heap detection part 113 removes a point group related to the obstacle(s) (20 in FIG. 6) from a point related to the raw material heap (11 in FIG. 6) detected (extracted) in Step A6, and interpolates a point group related to a deficient part(s) (17 in FIG. 7) created by removing the point group(s) related to the obstacle(s) (20 in FIG. 6) in the point group related to the raw material heap (11 in FIG. 6) (see Step A8 in FIG. 3).

When there is no point group related to the obstacle(s) (20 in FIG. 6) (NO in Step A7), or after Step A8, the raw material heap volume calculation part 114 of the information processing part 110 of the volume measurement apparatus 100 calculates a volume of a raw material heap non-occlusion part(s) (11a in FIG. 8) based on the point group (point group detected (extracted) in Step A6 or point group interpolated in Step A8) related to the raw material heap (11 in FIG. 8) (see Step A9 in FIG. 3).

Next, the raw material heap volume calculation part 114 confirms whether or not there is a wall(s) (12 in FIG. 2) on the raw material yard (10 in FIG. 2), using the point group (point group detected in step A6 or point group interpolated in step A8) related to the raw material heap (11 in FIG. 2) (see Step A10 in FIG. 3). When there is no wall (12 in FIG. 2) (NO in step A10), the process proceeds to Step A12.

When there is a wall (12 in FIG. 2) (YES in Step A10), the raw material heap volume calculation part 114 reads-out the wall position information from the wall position memory part 122 (see Step A11 in FIG. 3).

When there is no wall (12 in FIG. 2) (NO in Step A10), or after Step A11, the raw material heap volume calculation part 114 estimates a volume of the raw material heap occlusion part (11b in FIG. 8), using the point group(s) (detected point group(s) or interpolated point group(s)) related to the raw material heap (11 in FIG. 2) (see Step A12 in FIG. 3). Here, when the wall position information is read-out in Step A11, the raw material heap volume calculation part 114 estimates a volume of the raw material heap occlusion part (11b in FIG. 8), further using the wall position information.

Next, the raw material heap volume calculation part 114 calculates a volume (remaining amount of raw material) of the raw material heap (11 in FIG. 2), the volume being a sum of the volume of the raw material heap non-occlusion part(s) (11a in FIG. 8) calculated in Step A9 and the volume of the raw material heap occlusion part (11b in FIG. 8) estimated in Step A12 (see Step A13 in FIG. 3).

Finally, the output part 140 outputs (displays) the volume (remaining amount of raw material) of the raw material heap (11 in FIG. 2) calculated in Step A13 (see Step A14 in FIG. 3), and then ends. After the end, when a predetermined time elapses, the flow may be returned to the start and then Steps A1 to A13 are executed.

Here, a method of detecting the point group related to the raw material heap (11 in FIG. 4) in step A6 will be described.

With reference to FIG. 4, an equation of a plane 16 on a slope of the raw material heap 11 is set to [Equation 1], and a normal vector "$n_s$" perpendicular to the plane 16 is set to [Equation 2]. Also, an equation of the ground surface 14 in the raw material yard 10 is set to [Equation 3], and a normal vector "$n_g$" perpendicular to the ground surface 14 is set to [Equation 4]. An angle "$\theta$" formed by the plane 16 and the ground surface 14 can be expressed as [Equation 5], using the normal vectors "$n_s$" and "$n_g$".

$$a_s x + b_s y + c_s z + d_s = 0 \qquad \text{[Equation 1]}$$

$$n_s = \begin{pmatrix} a_s \\ b_s \\ c_s \end{pmatrix} \qquad \text{[Equation 2]}$$

$$a_g x + b_g y + c_g z + d_g = 0 \qquad \text{[Equation 3]}$$

$$n_g = \begin{pmatrix} a_g \\ b_g \\ c_g \end{pmatrix} \qquad \text{[Equation 4]}$$

$$\cos\theta = \frac{n_s \cdot n_g}{|n_s||n_g|} \qquad \text{[Equation 5]}$$

A point group in which the angle "$\theta$" formed by the plane 16 and the ground surface 14 satisfies the repose angle is detected as the raw material heap 11. As shown in FIG. 5, the point group related to the raw material heap 11 can be detected by the same method even if it has a complicated shape.

Next, in Step A8, removing of the point group(s) related to the obstacle(s) (20 in FIG. 6) and interpolating of the point group related to the deficient part(s) (17 in FIG. 7) will be described.

In a case where there is the obstacle(s) 20 that is columnar body (rectangular, cylinder, etc.) as shown in FIG. 6 between the imaging apparatus (200 in FIG. 2) and the raw material heap (11 in FIG. 2), when removing the point group related to the obstacle(s) 20 from the point group related to the raw material heap (11 in FIG. 2), the point group related to the raw material heap 11 having the deficient part(s) 17 is obtained as shown in FIG. 7. The deficient part(s) 17 is interpolated based on the point group related to the raw material heap 11 that has been acquired. As examples of an interpolation method, there are an image interpolation method such as a linear interpolation method, a nearest neighbor interpolation method, and a density storage method.

Next, a volume calculation method of the raw material heap non-occlusion part(s) (11a in FIG. 8) of the raw material heap (11 in FIG. 8) in Step A9 will be described.

With reference to FIG. 8, a volume of the raw material heap non-occlusion part 11a can be obtained by creating a convex hull based on the point group related to the raw material heap (11 in FIG. 8) detected (extracted) in step A6 or interpolated in step A8. The convex hull can be created, for example, by an algorithm using the Quickhull method described in Non-Patent Literature (NPTL) 1. The convex hull created by the algorithm using the Quickhull method is configured of a plurality of tetrahedrons as shown in FIG. 9. Setting a base area of the tetrahedron to "S" and setting a height to "h" as shown in FIG. 10, a volume $V_i$ of the tetrahedron can be calculated from a formula [Equation 6] of a volume of a triangular pyramid. By calculating a sum of volumes of each of the plurality of tetrahedrons, a volume of the entire convex hull can be calculated, and the calculated volume of the entire convex hull can be used as a volume of the raw material heap non-occlusion part 11a.

$$V_i = \frac{1}{3}Sh \quad \text{[Equation 6]}$$

Next, a volume estimation method of a raw material heap occlusion part (11b in FIG. 8) of a raw material heap (11 in FIG. 8) in Step A8 will be described.

With reference to FIG. 8, assuming that each of apexes of the raw material heap 11 viewed from the side is set to "A", "B", and "C", when a relationship between a z-axis distance "$d_{ac}$" between "A-C" and a z-axis distance "$d_{bc}$" between "B-C" satisfies [Equation 7], when setting a volume of the raw material heap non-occlusion part 1a to "$V_a$", a volume "$V_b$" of the raw material heap occlusion part 11b can be expressed as [Equation 8].

$$d_{ac} \leq d_{bc} \quad \text{[Equation 7]}$$

$$V_b = V_a \times 2 \quad \text{[Equation 8]}$$

Also, when a relationship between "$d_{ac}$" and "$d_{bc}$" is expressed by [Equation 9] as shown in FIG. 11, as shown in FIG. 12, by cropping (cutting out at a distance "$d_{bc}$" from the apex "C" of the raw material heap 11 (corresponding to a distance between the apex "C" and the wall)) a part corresponding to the raw material heap occlusion part 11b from the point group related to the raw material heap 11 (corresponding to the point group related to the raw material heap non-occlusion part 11a); creating a convex hull of the point group related to the cropped part; and calculating a sum of volumes of each of tetrahedrons configuring the created convex hull, a volume "$V_b$" of the raw material heap occlusion part 11b can be estimated. Here, a volume calculation by the convex hull is the same as the volume calculation method of the raw material heap non-occlusion part 11a in Step A9.

$$d_{ac} > d_{bc} \quad \text{[Equation 9]}$$

As shown in FIG. 13, when an approximate loading range 15 is determined, the raw material yard 10 does not have to be surrounded by walls on three sides of the raw material heap 11. In this case, the volume of the raw material heap 11 can be measured by the same method as the above-mentioned procedure by virtualizing (presuming) that there is a wall on an outer periphery of the loading range 15.

The above volume measurement system is used in managing raw materials and products in a smart factory region; managing dropped ore or dropped coal in a mining industry; managing raw materials in a food manufacturing industry; managing chips in a paper industry; and managing wastes in a waste treatment industry.

According to the first exemplary embodiment, it is possible to contribute to measuring of a volume of the raw material heap at low cost and efficiently without affecting operation of a factory, by calculating a volume of the raw material heap non-occlusion part 11a; estimating a volume of the raw material heap occlusion part 11b; and calculating a volume of the entire raw material heap 11. Also, according to the first exemplary embodiment, even if there are some defects or unevenness in the raw material heap 11, since the interpolation can be performed, the measurement is not affected. Further, according to the first exemplary embodiment, since a volume of the raw material heap 11 is calculated by properly using the repose angle information for non-rainy weather and the repose angle information for rainy weather, erroneous detection due to a change in weather can be reduced.

Second Exemplary Embodiment

Figure 14:
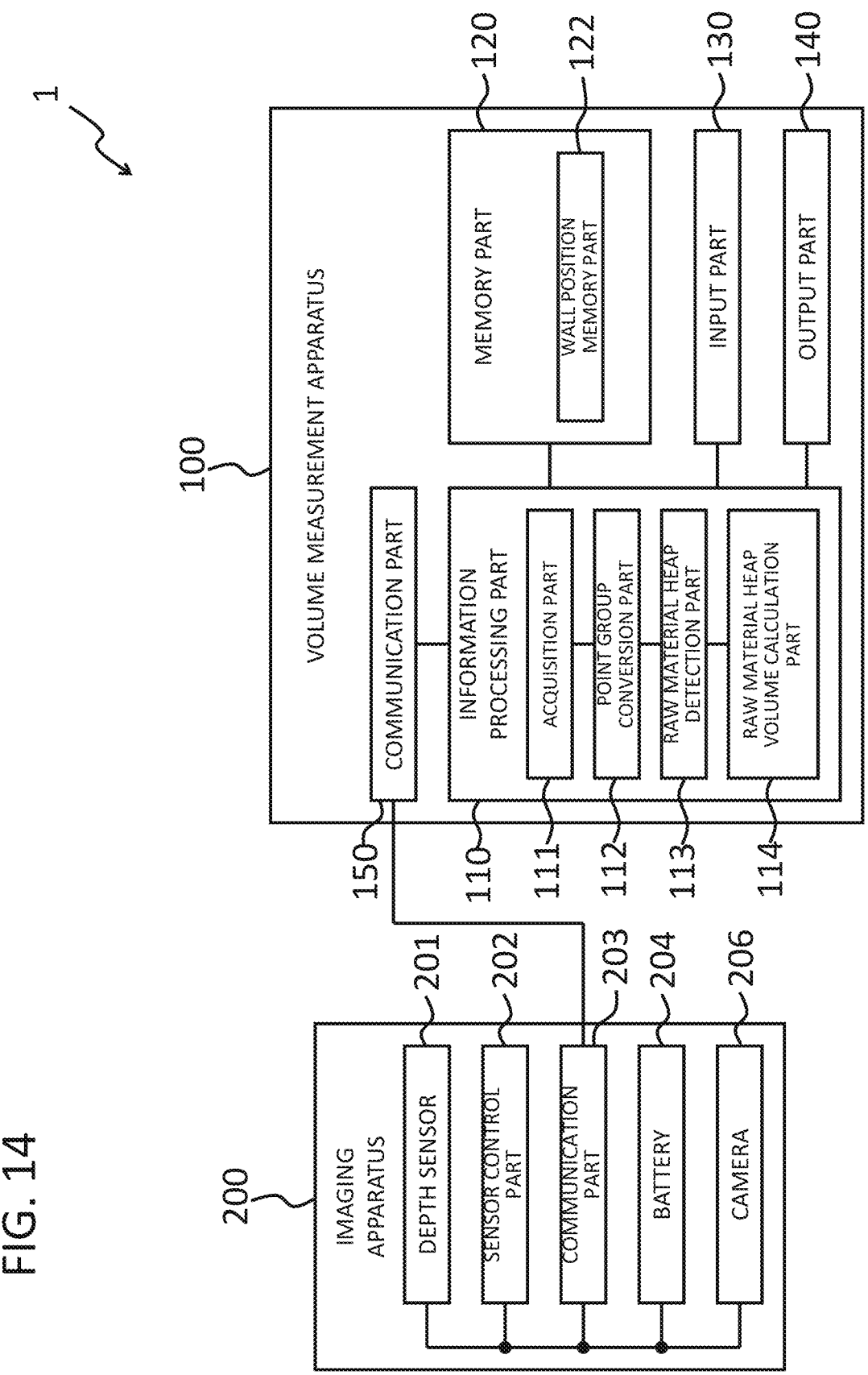
FIG. 14 is a block diagram schematically showing a configuration of a volume measurement system according to a second exemplary embodiment.

A volume measurement system according to a second exemplary embodiment will be described with reference to the drawings. FIG. 14 is a block diagram schematically showing a configuration of the volume measurement system according to the second exemplary embodiment.

The second exemplary embodiment is a modification of the first exemplary embodiment, and instead of properly using the repose angle information for rainy weather and non-rainy weather is preset, using the repose angle memory part (121 in FIG. 1) and the rain sensor (205 in FIG. 1), the repose angle information is measured in real time, using image data of a camera 206 provided in the imaging apparatus 200.

The imaging apparatus 200 comprises a camera 206. The camera 206 is a camera that shoots a subject and generates image data. The camera 206 outputs the generated image data to the volume measurement apparatus 100 through the communication part 203. As the camera 206, for example, a monocular RGB (Red Green Blue) camera or a stereo camera that can generate RGB image data can be used. If the depth sensor 201 can generate image data, the camera 206 can be omitted and image data generated by the depth sensor 201 can be used.

The raw material heap detection part 113 of the information processing part 110 of the volume measurement apparatus 100 does not perform rainfall detection (Step A3 in FIG. 3) and repose angle information reading-out (Steps A4 and A5 in FIG. 3), and a piece of repose angle information is measured, using image data from the camera 206 together with depth information acquired by the acquisition part 111. As a method of measuring a piece of repose angle information, for example, a method comprising: creating a model in which a texture of a surface of a raw material heap is learned by deep learning from image data; detecting a coordinate of the raw material heap, using the created model; and measuring a piece of repose angle information from depth information related to the raw material yard in the detected coordinate of the raw material heap can be used. The raw material heap detection part 113 detects (extracts) a point group related to the raw material heap (11 in FIG. 4) from the point group data related to the raw material yard (10 in FIG. 2) converted by the point group conversion part 112, using the measured repose angle information.

Other configurations and operations are the same as those of the first exemplary embodiment.

According to the second exemplary embodiment, similarly to the first exemplary embodiment, it is possible to contribute to measuring of a volume of a raw material heap at low cost and efficiently without affecting operation of a factory, and it is possible to reduce erroneous detection due to various factors by automating a measurement of a piece of repose angle information.

Third Exemplary Embodiment

Figure 15:
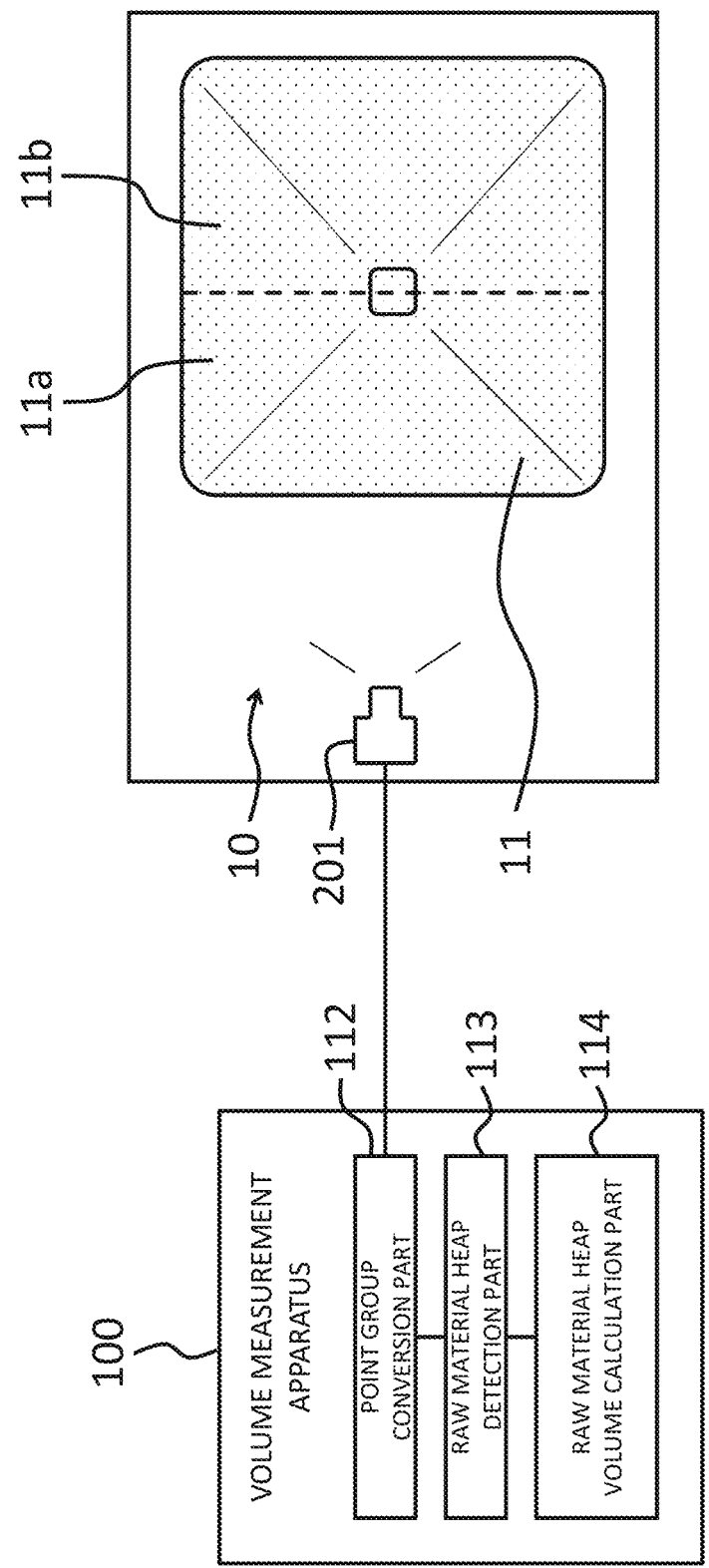
FIG. 15 is a block diagram schematically showing a configuration of a volume measurement apparatus according to a third exemplary embodiment.
Figure 16:
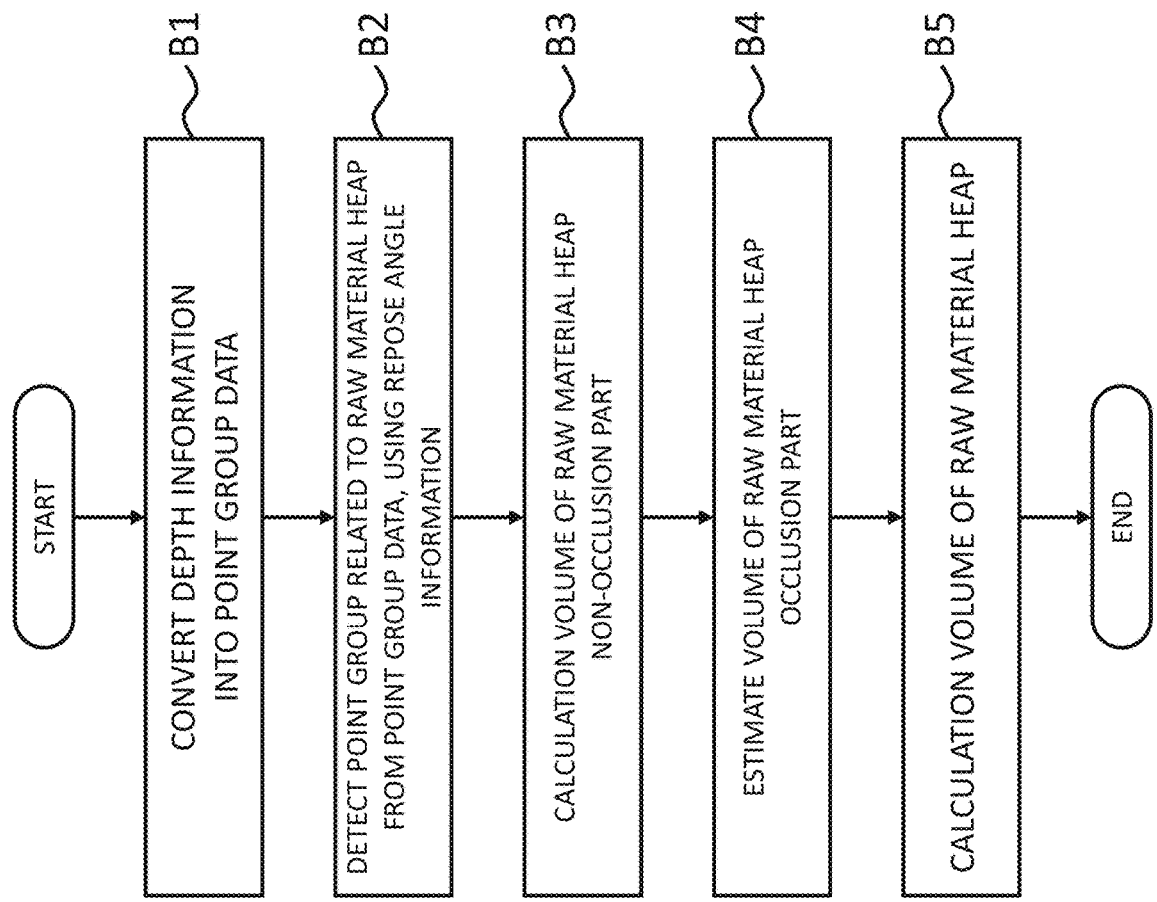
FIG. 16 is a flowchart schematically showing an operation of the volume measurement apparatus according to the third exemplary embodiment.
Figure 17:
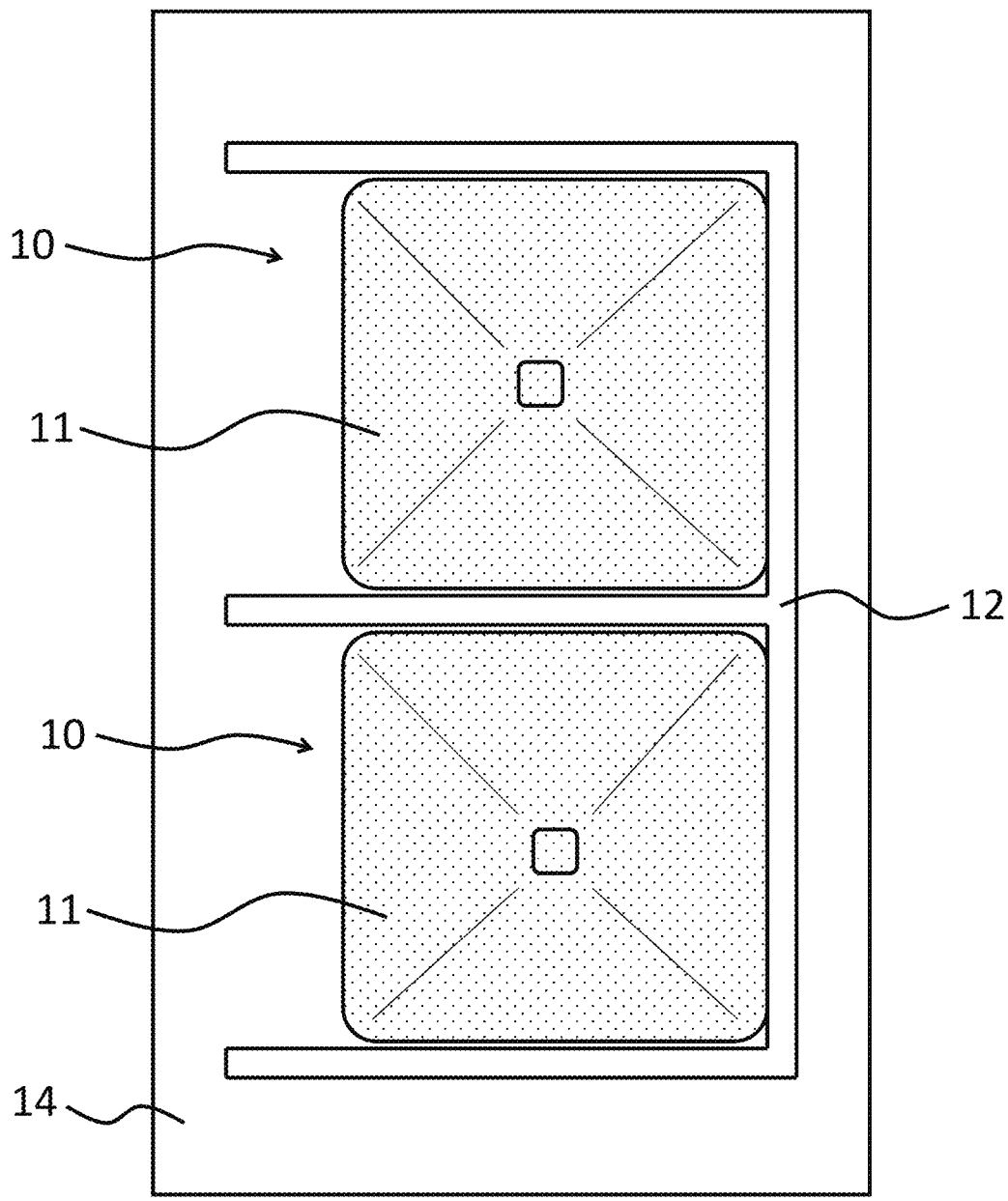
FIG. 17 is an image diagram when an example of a raw material yard is viewed from above.

A volume measurement apparatus according to a third exemplary embodiment will be described with reference to the drawings. FIG. 15 is a block diagram schematically showing a configuration of the volume measurement apparatus according to the third exemplary embodiment. FIG. 16 is a flowchart schematically showing an operation of the volume measurement apparatus according to the third exemplary embodiment.

The volume measurement apparatus 100 is an apparatus that measures a volume of a raw material heap 11. The volume measurement apparatus 100 comprises: a point group conversion part 112; a raw material heap detection part 113; and a raw material heap volume calculation part 114 (see FIG. 15).

The point group conversion part 112 converts depth information related to a raw material yard 10 from a depth sensor 201 that shoots the raw material yard 10 having the raw material heap 11 into point group data related to the raw material yard 10 (see Step B1 in FIG. 16).

The raw material heap detection part 113 detects a point group related to the raw material heap 11 from the point group data related to the raw material yard 10, using repose angle information related to a repose angle of the raw material heap 11 (see Step B2 in FIG. 16).

The raw material heap volume calculation part 114 calculates a volume of a raw material heap non-occlusion part 11a that can be shot from the depth sensor 201 in the raw material heap 11 based on the point group related to the raw material heap 11 (see Step B3 in FIG. 16). The raw material heap volume calculation part 114 estimates a volume of a raw material heap occlusion part 11b that cannot be shot from the depth sensor 201 in the raw material heap 11, using at least the point group related to the raw material heap 11 (see Step B4 in FIG. 16). The raw material heap volume calculation part 114 calculates a volume of the raw material heap 11 which is a sum of the calculated volume of the raw material heap non-occlusion part 11a and the estimated volume of the raw material heap occlusion part 11b (see Step B5 in FIG. 16).

According to the third exemplary embodiment, by calculating a volume of the raw material heap non-occlusion part 11a, and estimating a volume of the raw material heap occlusion part 11b to calculate a volume of the entire raw material heap 11, it is possible to contribute to measuring a volume of a raw material heap at low cost and efficiently without affecting operation of a factory.

Figure 18:
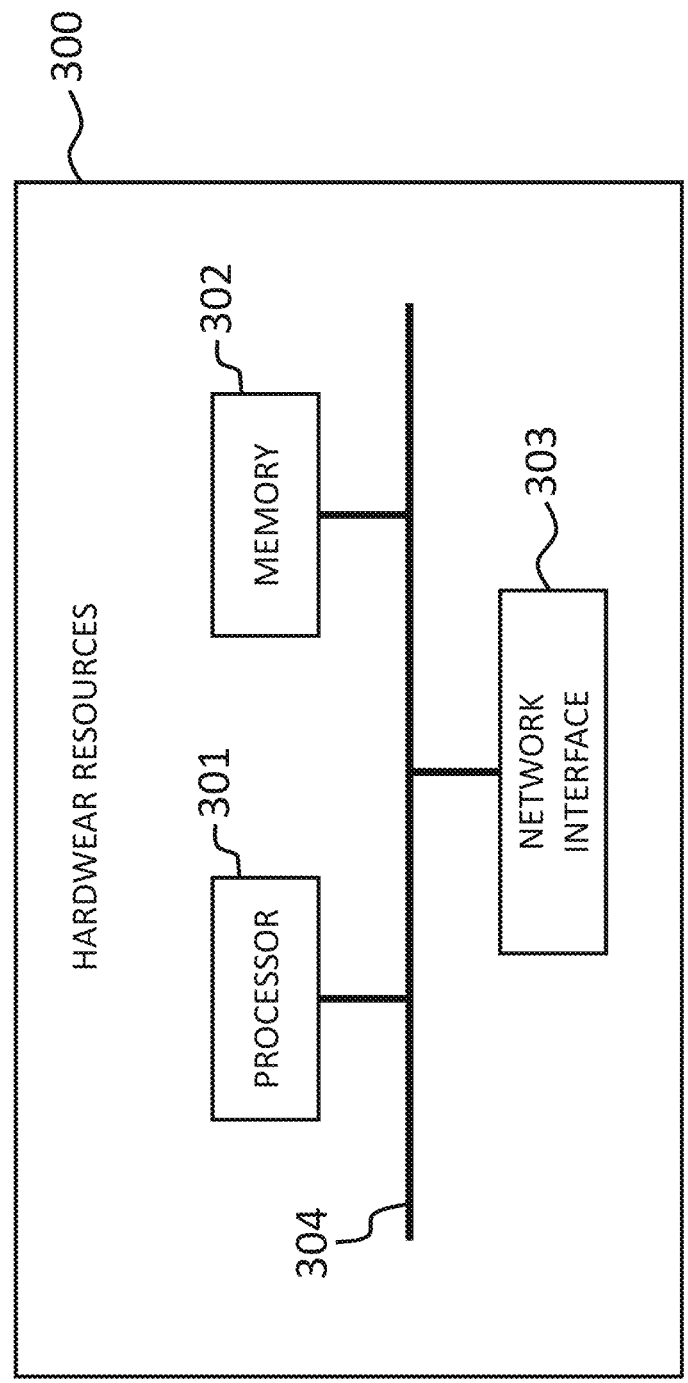
FIG. 18 is a block diagram schematically showing a configuration of hardware resources.

The volume measurement apparatus according to the first to third exemplary embodiments can be configured by so-called hardware resources (information processing apparatus, computer), and one comprising a configuration exemplarily shown in FIG. 18 can be used. For example, the hardware resource 300 comprises: a processor 301; a memory 302; a network interface 303; and the like, which are connected to each other by an internal bus 304.

Note that the configuration shown in FIG. 18 is not intended to limit a hardware configuration of the hardware resource 300. The hardware resource 300 may comprise hardware (for example, an input/output interface) (not shown). Alternatively, the number of units such as the processor 301 comprised in the hardware resource 300 is not limited to the example shown in FIG. 18, and for example, a plurality of processors 301 may be comprised in an apparatus. As the processor 301, for example, a CPU (Central Processing part), an MPU (Micro Processor Unit), or the like can be used.

As the memory 302, for example, RAM (Random Access Memory), ROM (Read Only Memory), HDD (Hard Disk Drive), SSD (Solid State Drive), or the like can be used.

As the network interface 303, for example, a LAN (Local Area Network) card, a network adapter, a network interface card, or the like can be used.

The function of the hardware resource 300 is realized by the above-mentioned processing module. For example, the processing module is realized by the processor 301 executing a program stored in the memory 302. Also, the program can be updated by downloading the program via a network or using a storage medium in which the program is stored. Further, the processing module may be realized by a semiconductor chip. That is, functions performed by the processing module may be realized by executing software on some hardware.

Part or all of the above exemplary embodiments may be described as appearing in the following MODEs, but is not limited to the following.

Mode 1

In the present invention, the mode of the volume measurement apparatus according to the first aspect is possible.

Mode 2

The volume measurement apparatus according to MODE 1, wherein when detecting a point group related to the raw material heap, the raw material heap detection part detects a point group where an angle formed by a plane on a slope of the raw material heap and a ground surface in the raw material yard satisfies the repose angle in the repose angle information, as the point group related to the raw material heap.

Mode 3

The volume measurement apparatus according to MODE 1 or 2, further comprising an acquisition part that acquires the depth information related to the raw material yard from the depth sensor, wherein when converting into the point group data related to the raw material yard, the point group conversion part converts the depth information related to the raw material yard acquired by the acquisition part into point group data related to the raw material yard.

Mode 4

The volume measurement apparatus according to any one of MODEs 1 to 3, further comprising a repose angle memory part that stores repose angle information for rainy weather and repose angle information for non-rainy weather,
wherein when detecting the point group related to the raw material heap, the raw material heap detection part confirms whether or not a rain sensor that detects a rainfall in the raw material yard detects a rainfall; reads-out the repose angle information for rainy weather from the repose angle memory part when the rain sensor detects a rainfall; reads-out the repose angle information for non-rainy weather from the repose angle memory part when the rain sensor does not detect rainfall; and detects a point group related to the raw material heap from the point group data related to the raw material yard, using the read-out repose angle information for rainy weather or the read-out repose angle information for non-rainy weather.

Mode 5

The volume measurement apparatus according to any one of MODEs 1 to 3,
wherein when detecting the point group related to the raw material heap, the raw material heap detection part measures repose angle information, using image data from a camera, and detects a point group related to the raw material heap from the point group data related to the raw material yard, using the measured repose angle information.

Mode 6

The volume measurement apparatus according to MODE 5, wherein when measuring the repose angle information, the raw material heap detection part creates a model in which a texture of a surface of the raw material heap is learned by deep learning from the image data; detects coordinates of the raw material heap, using the created model; and measures the repose angle information from the depth information related to the raw material yard at the coordinates of the detected raw material heap.

Mode 7

The volume measurement apparatus according to any one of MODEs 1 to 6, where
the raw material heap detection part further confirms whether or not there is a point group related to an obstacle existing between the raw material heap and the depth sensor in the point group data related to the raw material yard; removes the point group related to the obstacle from the detected point group related to the raw material heap when there is the point group related to the obstacle; and interpolates a point group related to a deficient part in the point group related to the raw material heap, the deficient part being caused by removing the point group related to the obstacle; and
in a case where the volume of the raw material heap non-occlusion part calculates, the raw material heap volume calculation part calculates a volume of the raw material heap non-occlusion part based on the point group related to the raw material heap in which the point group related to the deficient part is interpolated by the raw material heap detection part.

Mode 8

The volume measurement apparatus according to MODE 7, wherein when interpolating the point group related to the deficient part, the raw material heap detection part interpolates the point group related to the deficient part, using an image interpolation method.

Mode 9

The volume measurement apparatus according to MODE 7 or 8, wherein in a case where the volume of the raw material heap non-occlusion part calculates, when the raw material heap detection part does not have the point group related to the obstacle, the raw material heap calculation part calculates the volume of the raw material heap non-occlusion part based on the point group related to the raw material heap detected by the raw material heap detection part.

Mode 10

The volume measurement apparatus according to any one of MODEs 1 to 9,
wherein in a case where the volume of the raw material heap non-occlusion part calculates, the raw material heap volume calculation part creates a convex hull configured of a plurality of tetrahedrons based on a point group related to the raw material heap; calculates a volume of the entire convex hull by calculating a total volume of each of the plurality of tetrahedrons; and defines the calculated volume of the entire convex hull as the volume of the raw material heap non-occlusion part.

Mode 11

The volume measurement apparatus according to any one of MODEs 1 to 10, further comprising a wall position memory part that stores wall position information related to a wall position in the raw material yard, wherein, when estimating the volume of the raw material heap occlusion part, the raw material heap volume calculation part confirms whether or not there is a wall in the raw material yard, using the point group related to the raw material heap; reads-out the wall position information from the wall position memory part when there is a wall; and estimates a volume of the raw material heap occlusion part, using the point group related to the raw material heap and the wall position information.

Mode 12

The volume measurement apparatus according to MODE 11, wherein when estimating the volume of the raw material heap occlusion part, the raw material heap volume calculation part cuts-out a part corresponding to a distance between an apex of the raw material heap and the wall from the point group related to the raw material heap; create a convex hull configured of a plurality of tetrahedrons based on a point group related to the cut-out part; calculates a volume of the entire convex hull by calculating a total volume of each of the plurality of tetrahedrons; and defines the calculated volume of the entire convex hull as the volume of the raw material heap occlusion part.

Mode 13

The volume measurement apparatus according to MODE 11 or 12, wherein when estimating the volume of the raw material heap occlusion part, when there is no wall, the raw material heap volume calculation part estimates a volume of the raw material heap occlusion part, using the point group related to the raw material heap.

Mode 14

In the present invention, a mode of the volume measurement system according to the second aspect is possible.

Mode 15

In the present invention, a mode of the volume measurement method according to the third aspect is possible.

Mode 16

In the present invention, a mode of the program according to the fourth aspect is possible.

It should be noted that each disclosure of the above PTLs and NPTL shall be incorporated and described herein by reference and can be used as a basis or a part of the present invention as necessary. Within a framework of the entire disclosure of the present invention (including claims and drawings), it is possible to modify or adjust the exemplary embodiments or examples based on the basic technical concept thereof. Also, within the framework of entire disclosure of the present invention, various combinations or selections (non-selection if necessary) of various disclosed elements (including each element of each claim, each element of each exemplary embodiment or example, each element of each drawing, etc.) is possible. That is, it goes without saying that the present invention includes various deformations and modifications that can be made by one skilled in the art in accordance with all disclosures including claims and drawings, and the technical concept. Further, as to the numerical values and numerical ranges described in the present application, it is considered that arbitrary intermediate values, lower numerical values, and small ranges are described even if not explicitly recited. Furthermore, it is also considered that a matter used to combine part or all of each of the disclosed matters of the above-cited documents with the matters described in this document as a part of the disclosure of the present invention, in accordance with the gist of the present invention, if necessary, is included in the disclosed matters of the present application.

REFERENCE SIGNS LIST

1 Volume measurement system
10 Raw material yard
11 Raw material heap
11a Raw material heap non-occlusion part
11b Raw material heap occlusion part
12 Wall
13 Camera
14 Ground surface
15 Loading range
16 Plane
17 Deficient part
20 Obstacle
100 Volume measurement apparatus
110 Information processing part
111 Acquisition part
112 Point group conversion part
113 Raw material heap detection part
114 Raw material heap volume calculation part
120 Memory part
121 Repose angle memory part
122 Wall position memory part
130 Input part
140 Output part
150 Communication part
200 Imaging apparatus
201 Depth sensor
202 Sensor control part
203 Communication part
204 Battery
205 Rain sensor
206 Camera
300 Hardware resources
301 Processor
302 Memory
303 Network interface
304 Internal bus

What is claimed is:

1. A volume measurement apparatus, comprising:
a memory having stored therein program instructions; and
a processor executing the program instructions to implement:
    a point group conversion part that converts depth information related to a raw material yard from a depth sensor that shoots the raw material yard having a raw material heap into point group data related to the raw material yard;
    a raw material heap detection part that detects a point group related to the raw material heap from the point group data related to the raw material yard, using repose angle information related to a repose angle of the raw material heap; and
    a raw material heap volume calculation part that calculates a volume of the raw material heap non-occlusion part that can be shot from the depth sensor in the raw material heap based on the point group related to the raw material heap; estimates a volume of the raw material heap occlusion part that cannot be shot from the depth sensor in the raw material heap, using at least the point group related to the raw material heap; and calculates a volume of the raw material heap, which is a sum of the calculated volume of the raw material heap non-occlusion part and the estimated volume of the raw material heap occlusion part,
wherein the raw material heap detection part further confirms whether or not there is a point group related to an obstacle existing between the raw material heap and the depth sensor in the point group data related to the raw material yard; removes the point group related to the obstacle from the detected point group related to the raw material heap when there is the point group related to the obstacle; and interpolates a point group related to a deficient part in the point group related to the raw material heap, the deficient part being caused by removing the point group related to the obstacle; and
wherein the raw material heap volume calculation part calculates the volume of the raw material heap non-occlusion part based on the point group related to the raw material heap in which the point group related to the deficient part is interpolated by the raw material heap detection part.

2. The volume measurement apparatus according to claim 1,
wherein when detecting the point group related to the raw material heap, the raw material heap detection part detects a point group where an angle formed by a plane on a slope of the raw material heap and a ground surface in the raw material yard satisfies the repose angle in the repose angle information, as the point group related to the raw material heap.

3. The volume measurement apparatus according to claim 1,
wherein the program instructions further implement a repose angle memory part that stores repose angle information for rainy weather and repose angle information for non-rainy weather, and
wherein when detecting the point group related to the raw material heap, the raw material heap detection part confirms whether or not a rain sensor that detects a rainfall in the raw material yard detects a rainfall; reads-out the repose angle information for rainy weather from the repose angle memory part when the rain sensor detects a rainfall; reads-out the repose angle information for non-rainy weather from the repose angle memory part when the rain sensor does not detect rainfall; and detects the point group related to the raw material heap from the point group data related to the raw material yard, using the read-out repose angle information for rainy weather or the read-out repose angle information for non-rainy weather.

4. The volume measurement apparatus according to claim 1,
wherein when detecting the point group related to the raw material heap, the raw material heap detection part measures repose angle information, using the image data from the camera, and detects the point group related to the raw material heap from the point group data related to the raw material yard, using the measured repose angle information.

5. The volume measurement apparatus according to claim 1,
wherein the raw material heap volume calculation part creates a convex hull configured of a plurality of tetrahedrons based on a point group related to the raw material heap; calculates a volume of the entire convex hull by calculating a total volume of each of the plurality of tetrahedrons; and defines the calculated volume of the entire convex hull as the volume of the raw material heap non-occlusion part.

6. The volume measurement apparatus according to claim 1,
wherein the program instructions further implement a wall position memory part that stores wall position information related to a wall position in the raw material yard, and
wherein when estimating the volume of the raw material heap occlusion part, the raw material heap volume calculation part confirms whether or not there is a wall in the raw material yard, using the point group related to the raw material heap; reads-out the wall position information from the wall position memory part when there is a wall; and estimates the volume of the raw material heap occlusion part, using the point group related to the raw material heap and the wall position information.

7. The volume measurement apparatus according to claim 6,
wherein when estimating the volume of the raw material heap occlusion part, the raw material heap volume calculation part cuts-out a part corresponding to a distance between an apex of the raw material heap and the wall from the point group related to the raw material heap; creates a convex hull configured of a plurality of tetrahedrons based on a point group related to the cut-out part; calculates a volume of the entire convex hull by calculating a total volume of each of the plurality of tetrahedrons; and defines the calculated volume of the entire convex hull as the volume of the raw material heap occlusion part.

8. A volume measurement method performed by a computer and comprising:
converting depth information related to a raw material yard from a depth sensor that shoots the raw material yard having a raw material heap into point group data related to the raw material yard;
detecting a point group related to the raw material heap from the point group data related to the raw material yard, using repose angle information related to a repose angle of the raw material heap;
calculating a volume of the raw material heap non-occlusion part that can be shot from the depth sensor in the raw material heap based on the point group related to the raw material heap;
estimating a volume of the raw material heap occlusion part that cannot be shot from the depth sensor in the raw material heap, using at least the point group related to the raw material heap; and
calculating a volume of the raw material heap, which is a sum of the calculated volume of the raw material heap non-occlusion part and the estimated volume of the raw material heap occlusion part,
wherein detecting the point group related to the raw material heap includes confirming whether or not there is a point group related to an obstacle existing between the raw material heap and the depth sensor in the point group data related to the raw material yard; removing the oint roup related to the obstacle from the detected point group related to the raw material heap when there is the point group related to the obstacle; and interpolating a point group related to a deficient part in the point group related to the raw material heap, the deficient part being caused by removing the point group related to the obstacle; and
wherein calculating the volume of the raw material heap non-occlusion part includes calculating the volume of the raw material heap non-occlusion part based on the point group related to the raw material heap in which the point group related to the deficient part is interpolated.

9. A non-transitory computer readable recording medium storing a program causing hardware resources to execute:
converting depth information related to a raw material yard from a depth sensor that shoots the raw material yard having a raw material heap into point group data related to the raw material yard;
detecting a point group related to the raw material heap from the point group data related to the raw material yard, using repose angle information related to a repose angle of the raw material heap;
calculating a volume of the raw material heap non-occlusion part that can be shot from the depth sensor in the raw material heap based on the point group related to the raw material heap;

estimating a volume of the raw material heap occlusion part that cannot be shot from the depth sensor in the raw material heap, using at least the point group related to the raw material heap; and calculating a volume of the raw material heap, which is a sum of the calculated volume of the raw material heap non-occlusion part and the estimated volume of the raw material heap occlusion part, wherein detecting the point group related to the raw material heap includes confirming whether or not there is a point group related to an obstacle existing between the raw material heap and the depth sensor in the point group data related to the raw material yard; removing the oint roup related to the obstacle from the detected point group related to the raw material heap when there is the point group related to the obstacle; and interpolating a point group related to a deficient part in the point group related to the raw material heap, the deficient part being caused by removing the point group related to the obstacle; and wherein calculating the volume of the raw material heap non-occlusion part includes calculating the volume of the raw material heap non-occlusion part based on the point group related to the raw material heap in which the point group related to the deficient part is interpolated.

10. The volume measurement apparatus according to claim 1, wherein the program instructions further implement an acquisition part that acquires the depth information related to the raw material yard from the depth sensor, and wherein when converting the depth information related to the raw material yard into the point group data related to the raw material yard, the point group conversion part converts the depth information related to the raw material yard acquired by the acquisition part into the point group data related to the raw material yard.

11. The volume measurement apparatus according to claim 4, wherein when measuring the repose angle information, the raw material heap detection part creates a model in which a texture of a surface of the raw material heap is learned by deep learning from the image data; detects coordinates of the raw material heap, using the created model; and measures the repose angle information from the depth information related to the raw material yard at the coordinates of the detected raw material heap.

12. The volume measurement apparatus according to claim 1, wherein when interpolating the point group related to the deficient part, the raw material heap detection part interpolates the point group related to the deficient part, using an image interpolation method.

13. The volume measurement apparatus according to claim 1, wherein when the raw material heap detection part does not have the point group related to the obstacle, the raw material heap calculation part calculates the volume of the raw material heap non-occlusion part based on the point group related to the raw material heap detected by the raw material heap detection part.

14. The volume measurement apparatus according to claim 6, wherein when there is no wall, the raw material heap volume calculation part estimates the volume of the raw material heap occlusion part, using the point group related to the raw material heap.

15. The volume measurement apparatus according to claim 2, wherein the program instructions further implement a repose angle memory part that stores repose angle information for rainy weather and repose angle information for non-rainy weather, and wherein when detecting the point group related to the raw material heap, the raw material heap detection part confirms whether or not a rain sensor that detects a rainfall in the raw material yard detects a rainfall; reads-out the repose angle information for rainy weather from the repose angle memory part when the rain sensor detects a rainfall; reads-out the repose angle information for non-rainy weather from the repose angle memory part when the rain sensor does not detect rainfall; and detects the point group related to the raw material heap from the point group data related to the raw material yard, using the read-out repose angle information for rainy weather or the read-out repose angle information for non-rainy weather.

16. The volume measurement apparatus according to claim 2, wherein when detecting the point group related to the raw material heap, the raw material heap detection part measures repose angle information, using the image data from the camera, and detects the point group related to the raw material heap from the point group data related to the raw material yard, using the measured repose angle information.

* * * * *